(12) United States Patent
Yu et al.

(10) Patent No.: US 10,616,384 B2
(45) Date of Patent: Apr. 7, 2020

(54) METHOD AND APPARATUS FOR TRANSMITTING TRIGGER FRAME IN WIRELESS LOCAL AREA NETWORK

(71) Applicant: Huawei Technologies Co., Ltd., Shenzhen, Guangdong (CN)

(72) Inventors: Jian Yu, Shenzhen (CN); Xun Yang, Shenzhen (CN); Meilu Lin, Shenzhen (CN); Yuchen Guo, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/004,227

(22) Filed: Jun. 8, 2018

(65) Prior Publication Data

US 2018/0295221 A1    Oct. 11, 2018

Related U.S. Application Data

(63) Continuation of application No. PCT/CN2016/104336, filed on Nov. 2, 2016.

(30) Foreign Application Priority Data

Dec. 11, 2015   (CN) .......................... 2015 1 0920381

(51) Int. Cl.
*H04L 29/08* (2006.01)
*H04W 72/04* (2009.01)
*H04W 84/12* (2009.01)

(52) U.S. Cl.
CPC ......... *H04L 69/324* (2013.01); *H04W 72/042* (2013.01); *H04W 84/12* (2013.01)

(58) Field of Classification Search
CPC .... H04L 69/324; H04W 72/042; H04W 84/12
See application file for complete search history.

(56) References Cited

U.S. PATENT DOCUMENTS

2012/0147804 A1   6/2012   Hedayat et al.
2014/0192694 A1*  7/2014   Pantelidou ........ H04W 52/0216
                                                   370/311
(Continued)

FOREIGN PATENT DOCUMENTS

CN   102013959 A    4/2011
CN   103095426 A    5/2013
(Continued)

OTHER PUBLICATIONS

R. Stacey; "IEEE P802.11 Wireless LANs—Specification Framework for TGax"; IEEE 802.11-15/0132r13; Nov. 2015; 38 pages.
(Continued)

*Primary Examiner* — Brian D Nguyen
(74) *Attorney, Agent, or Firm* — Womble Bond Dickinson (US) LLP

(57) ABSTRACT

Embodiments of the present disclosure disclose a method and an apparatus for transmitting a trigger frame in a wireless local area network. The method for transmitting a trigger frame in a wireless local area network includes: generating, by an access point, a trigger frame carrying a target media access control MAC function, where the trigger frame includes indication information, the indication information is used to instruct a first station to send a MAC frame corresponding to the target MAC function, and the indication information is used to instruct a second station not to perform the target MAC function; and sending, by the access point, the trigger frame. In the present disclosure, the indication information is used to instruct the first station to send the MAC frame corresponding to the target MAC function without limiting the second station, so that data sending manners of the first station and the second station can be flexibly controlled.

8 Claims, 17 Drawing Sheets

(56) References Cited

U.S. PATENT DOCUMENTS

| | | | |
|---|---|---|---|
| 2016/0165574 A1* | 6/2016 | Chu | H04L 5/0007 |
| | | | 370/312 |
| 2017/0127298 A1 | 5/2017 | Ryu et al. | |
| 2017/0339692 A1* | 11/2017 | Chun | H04L 1/0003 |
| 2017/0339694 A1 | 11/2017 | Yu et al. | |
| 2018/0263047 A1* | 9/2018 | Kim | H04B 7/26 |
| 2018/0310330 A1* | 10/2018 | Chun | H04L 5/0053 |

FOREIGN PATENT DOCUMENTS

| | | |
|---|---|---|
| WO | 2012028041 A1 | 3/2012 |
| WO | 2015035945 A1 | 3/2015 |
| WO | 2015186887 A1 | 12/2015 |
| WO | 2017036257 A1 | 3/2017 |

OTHER PUBLICATIONS

"IEEE Standard for Information technology—Telecommunications and information exchange between systems—Local and metropolitan area networks—Specific Requirements Part 11:Wireless LAN Medium Access Control (MAC) and Physical Layer (PHY) Specifications"; IEEE Std 802.11-2012; Mar. 29, 2012; 2793 pages.

"IEEE Standard for Information technology—Telecommunications and information exchange between systems—Local and metropolitan area networks—Specific Requirements Part 11:Wireless LAN Medium Access Control (MAC) and Physical Layer (PHY) Specifications Amendment 4:Enhancements for Very High Throughput for Operation in Bands below 6 GHz"; IEEE 802.11ac-2013; Dec. 18, 2013; 425 pages.

\* cited by examiner

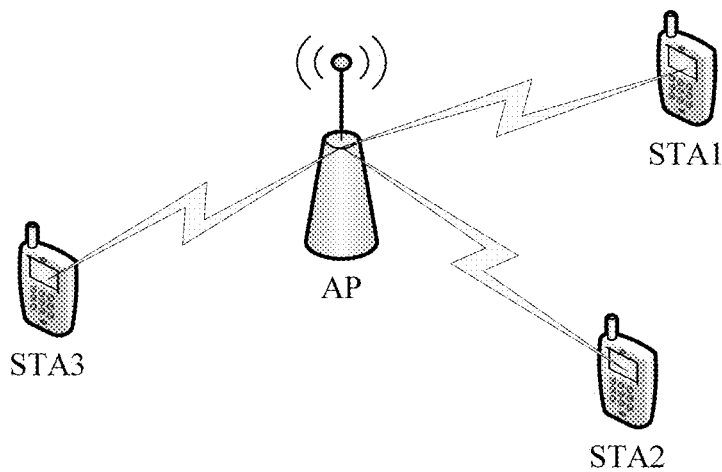

FIG. 1c

An access point generates a trigger frame carrying a target media access control MAC function, where the trigger frame includes indication information, the indication information is used to instruct a first station to send a MAC frame corresponding to the target MAC function, and the indication information is used to instruct a second station not to perform the target MAC function — S200

Send the trigger frame — S201

FIG. 2

METHOD AND APPARATUS FOR TRANSMITTING TRIGGER FRAME IN WIRELESS LOCAL AREA NETWORK

CROSS-REFERENCE TO RELATED APPLICATIONS

This application is a continuation of International Application No. PCT/CN2016/104336, filed on Nov. 2, 2016, which claims priority to Chinese Patent Application No. 201510920381.X, filed on Dec. 11, 2015. The disclosures of the aforementioned applications are hereby incorporated by reference in their entireties.

TECHNICAL FIELD

The present application relates to the field of wireless technologies, and in particular, to a method and an apparatus for transmitting a trigger frame in a wireless local area network.

BACKGROUND

Currently, the Institute of Electrical and Electronic Engineers (IEEE) is drawing up a standard 802.11ax of a next-generation wireless local area network (WLAN). An orthogonal frequency division multiple access (OFDMA) technology will be introduced into 802.11ax. The OFDMA technology allows an access point (AP) to perform multiuser transmission with a plurality of stations (STA) at the same time. Therefore, a trigger frame needs to be defined. The trigger frame is sent by an AP, and is used to perform resource indication for uplink multiuser transmission. After receiving the trigger frame, a plurality of STAs send an uplink frame almost at the same time based on resource scheduling information in the trigger frame.

It has been determined that a trigger frame structure shown in FIG. 1a is adopted in a draft standard. The trigger frame is a Media Access Control (MAC) frame including a MAC frame header (MAC header), a frame body, and a frame check sequence field. The frame body may carry different MAC functions, such as channel detection, a block acknowledge request (BAR), or Multiple User-Request to Send (MU-RTS). Specifically, as shown in the figure, the frame body includes a common area and a per station area. The common area includes resource indication information that needs to be read by all STAs, and the per station area includes resource indication information that needs to be read by each STA.

In an actual application scenario, generally, an STA needs to respond, based on a MAC function carried in a trigger frame, with a MAC frame of a type corresponding to the MAC function; for example, the STA responds with a block acknowledge (BA) frame or an acknowledge (ACK) frame. In the prior art, a trigger frame type indication that is used to represent a MAC function carried in the trigger frame is added to the trigger frame, so as to indicate usage of the trigger frame, and send, based on the usage, corresponding MAC function information when trigger information is sent. As shown in FIG. 1b, FIG. 1b shows a trigger frame designed for multiuser detection. By introducing a trigger frame type into the trigger frame, different content is designed for trigger frames of different types. In addition to carrying trigger information, the common area and the per station area carry MAC function information. Each STA may obtain an uplink transmission resource based on the trigger information, and may respond, based on the MAC function information, with a MAC frame corresponding to a MAC function carried in the trigger frame.

However, a disadvantage in the prior art is that information received by each STA needs to include both trigger information and MAC function information, and each STA needs to respond, based on a trigger frame type indication, with a MAC frame of a corresponding type based on the MAC function information. This leads to a limitation, because some STAs may not need to respond with a MAC frame of a corresponding type.

SUMMARY

Embodiments of the present disclosure provide a method and an apparatus for transmitting a trigger frame in a wireless local area network, so that indication information may be used to instruct a first station to send a MAC frame corresponding to a target MAC function without limiting a second station, and data sending manners of the first station and the second station can be flexibly controlled.

According to a first aspect, an embodiment of the present disclosure provides a method for transmitting a trigger frame in a wireless local area network, including:

generating, by an access point, a trigger frame carrying a target media access control MAC function, where the trigger frame includes indication information, the indication information is used to instruct a first station to send a MAC frame corresponding to the target MAC function, and the indication information is used to instruct a second station not to perform the target MAC function; and sending, by the access point, the trigger frame. The indication information is added to the trigger frame, and the indication information is used to instruct the first station to send the MAC frame corresponding to the target MAC function without limiting the second station, so that the second station may not perform the target MAC function, and data sending manners of the first station and the second station can be flexibly controlled.

Based on the first aspect, in a first feasible implementation of the first aspect, the first station includes at least one station, and the second station includes at least one station;

the trigger frame includes first information of the first station and second information of the second station;

the first information includes first trigger information corresponding to the first station and MAC function information corresponding to the first station, and the first station sends, based on the MAC function information, a MAC frame corresponding to the target MAC function; and the second information includes second trigger information corresponding to the second station.

Based on the first feasible implementation of the first aspect, in a second feasible implementation of the first aspect, the indication information includes an indication value that is used to represent a quantity of target stations included in the first station;

in the per station area of the trigger frame, consecutive target fields that start with a preset location and that are corresponding to the quantity of the targets include the first information of the first station; and in the per station area of the trigger frame, a field other than the target fields includes the second information of the second station. The quantity of targets included in the first station is indicated, and the first information of the first station is encapsulated in the target field, so that each station determines, based on the quantity of the targets and the preset location of the target field, whether the station needs to send the MAC frame corresponding to the target MAC function.

Based on the first feasible implementation of the first aspect, in a third feasible implementation of the first aspect, the indication information includes an indication character, the indication character includes a first character and a second character, the first character is used to instruct a corresponding station to send a MAC frame corresponding to the target MAC function, and the second character is used to instruct a corresponding station not to perform the target MAC function. The indication character is used to instruct the corresponding station whether to send the MAC frame corresponding to the target MAC function. This indication manner is accurate, convenient, and has small overheads.

Based on the third feasible implementation of the first aspect, in a fourth feasible implementation of the first aspect, an indication character of the first station and an indication character of the second station are located in a common field of the trigger frame; and the per station area of the trigger frame includes station field information that has a sequence that is consistent with a sequence of all indicated stations corresponding to all indication characters in the common field, and the station field information includes the first information corresponding to each station in the first station or the second information corresponding to each station in the second station. All indication characters of the first station and the second station are placed in the common field for indication, and the per station area needs to include information about each station. In this way, the station may learn in advance allocation of all per station fields, and prepare for extraction and parsing of content of the per station field.

Based on the third feasible implementation of the first aspect, in a fifth feasible implementation of the first aspect, the indication character is located in a station field corresponding to each station in the per station area of the trigger frame, and the indication character is used to instruct a station corresponding to the station field whether to send a MAC frame corresponding to the target MAC function. The indication character is encapsulated in a station field corresponding to each station in the per station area of the trigger frame for the station to read. A station may further read an indication character when reading trigger information of the station, and determine, based on the indication character, whether to perform the target MAC function.

Based on the first feasible implementation of the first aspect, in a sixth feasible implementation of the first aspect, the trigger frame includes a MAC function field of the first station and a MAC function field of the second station, the MAC function information corresponding to the first station is encapsulated in the MAC function field of the first station, the indication information is encapsulated in the MAC function field of the second station, the indication information includes a default value, and the default value is used to instruct the second station not to perform the target MAC function. The default value is encapsulated in a MAC function field of a station that does not need to perform the target MAC function to instruct the station whether to perform the target MAC function. This indication manner may ensure a unified format of fields in the per station area of each station.

According to a second aspect, an embodiment of the present disclosure provides an apparatus for transmitting a trigger frame in a wireless local area network, including:

a baseband circuit, configured to generate a trigger frame carrying a target media access control MAC function, where the trigger frame includes indication information, the indication information is used to instruct a first station to send a MAC frame corresponding to the target MAC function, and the indication information is used to instruct a second station not to perform the target MAC function; and a radio frequency circuit, configured to send the trigger frame. The indication information is added to the trigger frame, and the indication information is used to instruct the first station to send the MAC frame corresponding to the target MAC function without limiting the second station, so that the second station may not perform the target MAC function, and data sending manners of the first station and the second station can be flexibly controlled.

Based on the second aspect, in a first feasible implementation of the second aspect, the first station includes at least one station, and the second station includes at least one station;

the trigger frame includes first information of the first station and second information of the second station;

the first information includes first trigger information corresponding to the first station and MAC function information corresponding to the first station, and the first station sends, based on the MAC function information, a MAC frame corresponding to the target MAC function; and the second information includes second trigger information corresponding to the second station.

Based on the first feasible implementation of the second aspect, in a second feasible implementation of the second aspect, the indication information includes an indication value that is used to represent a quantity of target stations included in the first station;

in the per station area of the trigger frame, consecutive target fields that start with a preset location and that are corresponding to the quantity of the targets include the first information of the first station; and in the per station area of the trigger frame, a field other than the target fields includes the second information of the second station. The quantity of targets included in the first station is indicated, and the first information of the first station is encapsulated in the target field, so that each station determines, based on the quantity of the targets and the preset location of the target field, whether the station needs to send the MAC frame corresponding to the target MAC function.

Based on the first feasible implementation of the second aspect, in a third feasible implementation of the second aspect, the indication information includes an indication character, the indication character includes a first character and a second character, the first character is used to instruct a corresponding station to send a MAC frame corresponding to the target MAC function, and the second character is used to instruct a corresponding station not to perform the target MAC function. The indication character is used to instruct the corresponding station whether to send the MAC frame corresponding to the target MAC function. This indication manner is accurate, convenient, and has small overheads.

Based on the third feasible implementation of the second aspect, in a fourth feasible implementation of the second aspect, an indication character of the first station and an indication character of the second station are located in a common field of the trigger frame; and the per station area of the trigger frame includes station field information that has a sequence that is consistent with a sequence of all indicated stations corresponding to all indication characters in the common field, and the station field information includes the first information corresponding to each station in the first station or the second information corresponding to each station in the second station. In this way, the station may learn in advance allocation of all per station fields, and prepare for extraction and parsing of content of the per station field.

Based on the third feasible implementation of the second aspect, in a fifth feasible implementation of the second aspect, the indication character is located in a station field corresponding to each station in the per station area of the trigger frame, and the indication character is used to instruct a station corresponding to the station field whether to send a MAC frame corresponding to the target MAC function. The indication character is encapsulated in a station field corresponding to each station in the per station area of the trigger frame for the station to read. A station may further read an indication character when reading trigger information of the station, and determine, based on the indication character, whether to perform the target MAC function.

Based on the first feasible implementation of the second aspect, in a sixth feasible implementation of the second aspect, the trigger frame includes a MAC function field of the first station and a MAC function field of the second station, the MAC function information corresponding to the first station is encapsulated in the MAC function field of the first station, the indication information is encapsulated in the MAC function field of the second station, the indication information includes a default value, and the default value is used to instruct the second station not to perform the target MAC function. The default value is encapsulated in a MAC function field of a station that does not need to perform the target MAC function to instruct the station whether to perform the target MAC function. This indication manner may ensure a unified format of fields in the per station area of each station.

In the embodiments of the present disclosure, the access point generates the trigger frame carrying the target MAC function, and the trigger frame includes the indication information. The indication information is used to instruct the first station to send the MAC frame corresponding to the target MAC function, and is used to instruct the second station not to perform the target MAC function. That is, a MAC frame type sent by the second station is not limited, and data sending manners of the first station and the second station can be flexibly controlled.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1c is a schematic diagram of an application scenario according to the present disclosure;

FIG. 2 is a schematic flowchart of a method for transmitting a trigger frame in a wireless local area network according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure may be applied to a WLAN. Currently, standards used by the WLAN are IEEE 802.11 series. The WLAN may include a plurality of basic service sets (BSS), network nodes in the basic service sets are stations, and the stations include access points (AP) station and none access point stations (Non-AP STA). The non-AP STAs are collectively referred to as STAs in the embodiments of the present disclosure. Each basic service set may include one AP and a plurality of STAs associated with the AP.

An access point station may also be referred to as a wireless access point, a hotspot, or the like. The AP is an access point used by a mobile user to access a wired network, and is mainly deployed in a family, a building, or a park, and a typical coverage radius is of tens of meters to hundreds of meters. Certainly, the AP may also be deployed outdoors. The AP is equivalent to a bridge connecting a wired network and a wireless network. A main function of the AP is to connect wireless network clients together, and then connect the wireless network to an Ethernet network. Specifically, the AP may be a terminal device or a network device with a Wireless Fidelity (WiFi) chip. Optionally, the AP may be a device that supports an 802.11ax standard. Further, optionally, the AP may be a device that supports a plurality of WLAN standards, such as 802.11ac, 802.11n, 802.11g, 802.11b, and 802.11a.

A non-access point station may be a wireless communications chip, a wireless sensor, or a wireless communications terminal, for example, a mobile telephone that supports a WiFi communication function, a tablet computer that supports a WiFi communication function, a set top box that supports a WiFi communication function, a smart TV that supports a WiFi communication function, an intelligent wearable device that supports a WiFi communication function, a vehicular communications device that supports a WiFi communication function, or a computer that supports a WiFi communication function. Optionally, the station STA may support the 802.11ax standard. Further, optionally, the station supports a plurality of WLAN standards, such as 802.11ac, 802.11n, 802.11g, 802.11b, and 802.11a.

Figure 1A:
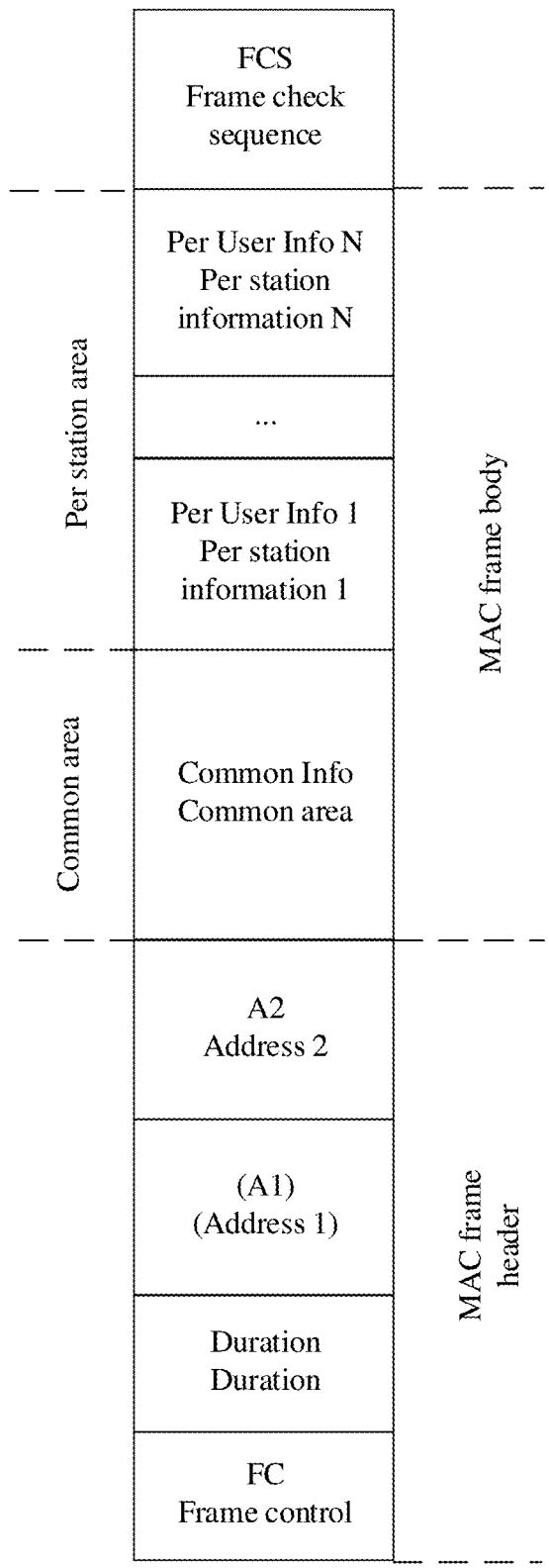
FIG. 1a is a structural diagram of a trigger frame in the prior art.
Figure 1B:
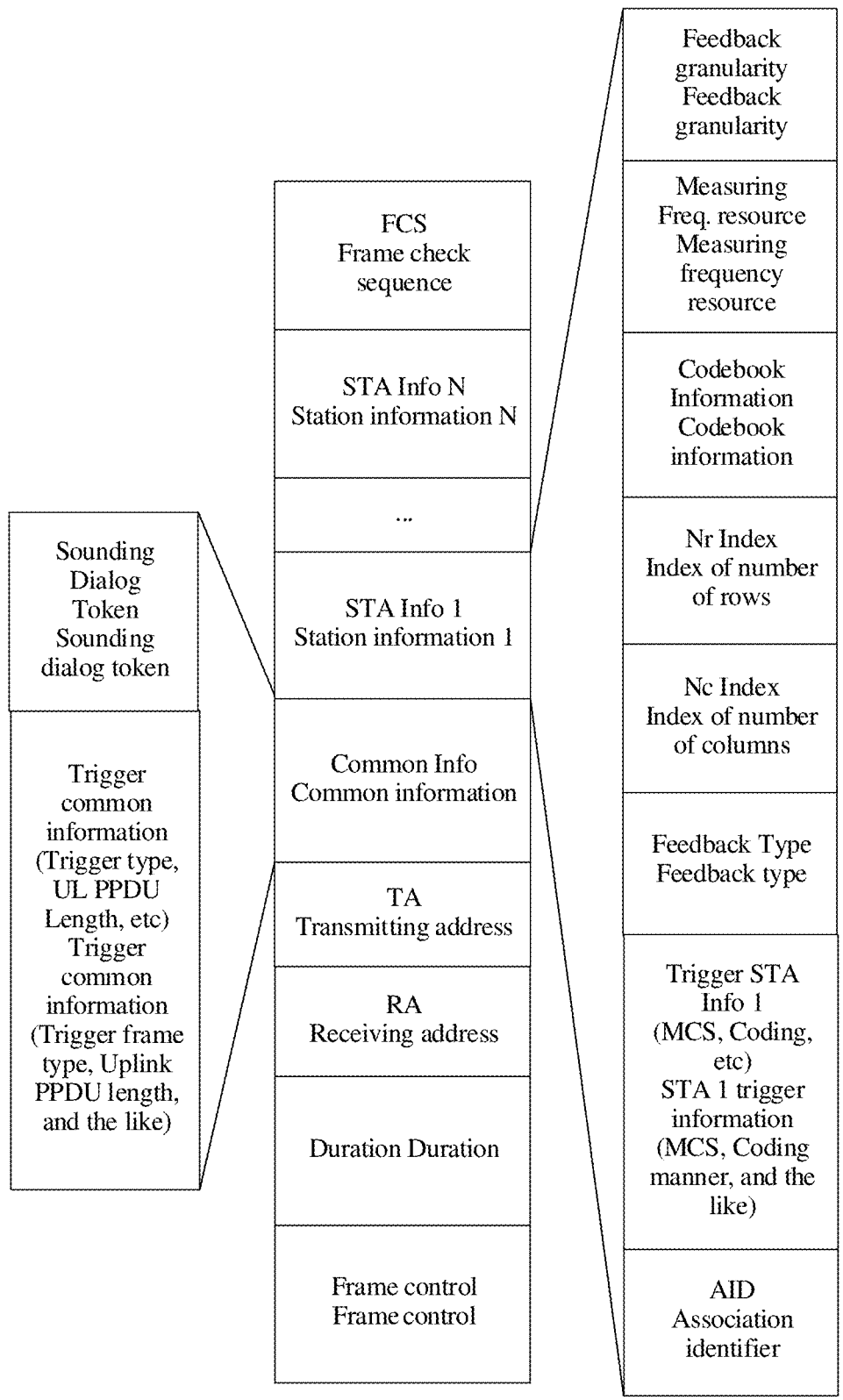
FIG. 1b is a structural diagram of another trigger frame in the prior art.

FIG. 1c is a schematic diagram of a system of a typical WLAN deployment scenario, including one AP and three STAs. The AP separately communicates with an STA 1, an STA 2, and an STA 3.

In an 802.11ax of a WLAN system into which an OFDMA technology is introduced, the AP may perform uplink or downlink transmission with different STAs on different time-frequency resources. The AP may perform the uplink or downlink transmission in different modes, such as an OFDMA single-user multiple-input multiple-output (SU-MIMO) mode or an OFDMA multi-user multiple-input multiple-output (MU-MIMO).

When the AP may perform the uplink or downlink transmission with a plurality of STAs, the AP needs to perform resource indication on each scheduled STA. In this embodiment, the AP sends a trigger frame to each STA, and provides resource indication information, so that the STA may learn whether the STA is scheduled, where an allocated uplink transmission resource is, what parameters should be used for transmission, how long a transmission time is, and the like. All the information may be indicated by using trigger information in the trigger frame. Optionally, the trigger frame sent by the AP further carries a special MAC function, so as to instruct the STA to send a MAC frame of a type corresponding to the special MAC function, for example, a BA frame or an ACK frame.

In the prior art, each STA needs to include both trigger information and MAC function information. Each STA needs to respond, based on a trigger frame type indication, with a MAC frame of a corresponding type based on the MAC function information. This leads to a limitation. For example, in FIG. 1c, the AP actually requires only the STA 1 and the STA 2 to send a MAC frame corresponding to a MAC function carried in a trigger frame, and a data sending manner of the STA 3 does not need to be limited. According to a trigger frame design manner in the prior art, each STA needs to send a MAC frame corresponding to a carried MAC function. In the present disclosure, indication information is designed in a trigger frame to instruct the first station (for example, the STA 1 and the STA 2 in FIG. 1c) to send a MAC frame corresponding to a MAC function carried in the trigger frame, and to instruct the second station (for example, the STA 3 in FIG. 1c) not to perform the MAC function; that is, data is directly sent based on trigger information corresponding to the second station in the trigger frame, and a data sending manner of the second station may not further be limited.

It should be noted that a MAC function field described in this embodiment of the present disclosure is a field that is based on a different trigger type and that has different content, and is also referred to as a type specific field.

Optionally, in this embodiment of the present disclosure, the first station and the second station may coexist. In addition, there are two special cases: a case in which all stations are first stations, or a case in which all the stations are second stations. Existence condition of the first station and the second station may be learned by using the indication information in this embodiment of the present disclosure.

Referring to FIG. 2, FIG. 2 is a flowchart of a method for transmitting a trigger frame in a wireless local area network according to an embodiment of the present disclosure. The method may be applied to an access point, for example, the AP in FIG. 1c, and the access point may support a next-generation WLAN standard, for example, an 802.11ax standard. FIG. 2 is a flowchart of transmitting a trigger frame in the wireless local area network, and specific steps are as follows:

S200. An access point generates a trigger frame carrying a target media access control MAC function, where the trigger frame includes indication information, the indication information is used to instruct a first station to send a MAC frame corresponding to the target MAC function, and the indication information is used to instruct a second station not to perform the target MAC function.

Figure 3:
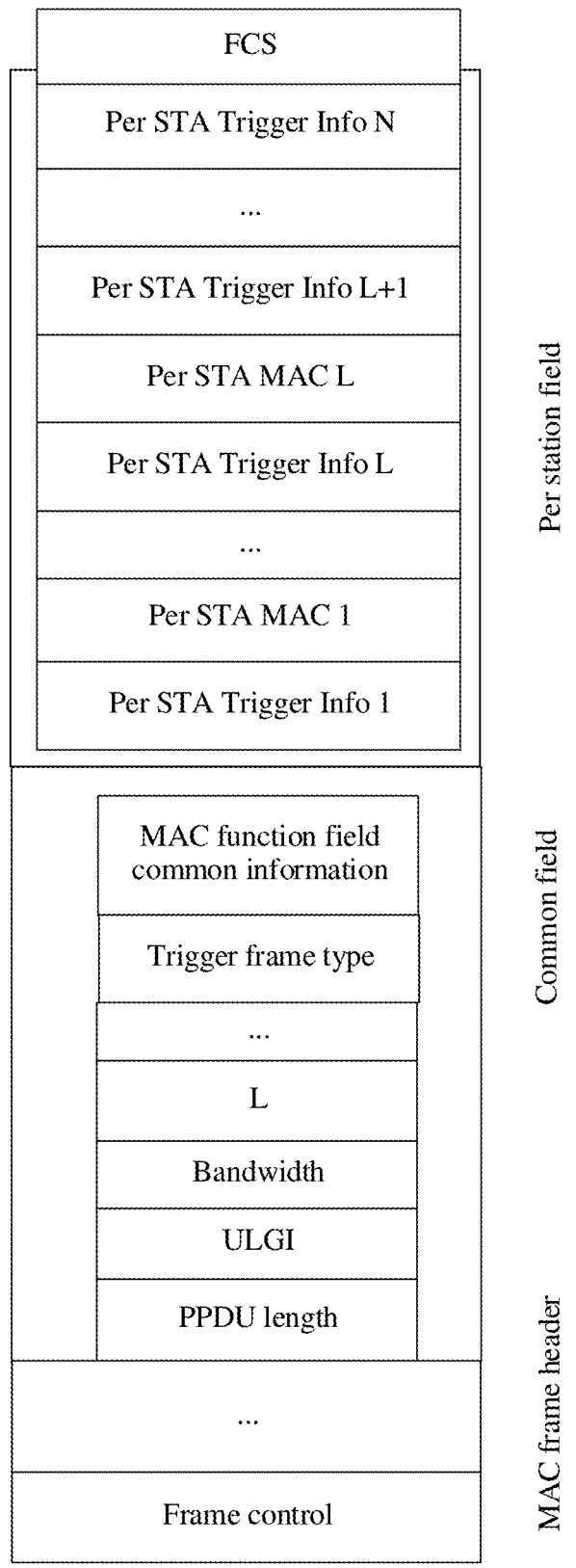
FIG. 3 is a schematic structural diagram of a first trigger frame according to an embodiment of the present disclosure.
Figure 13:
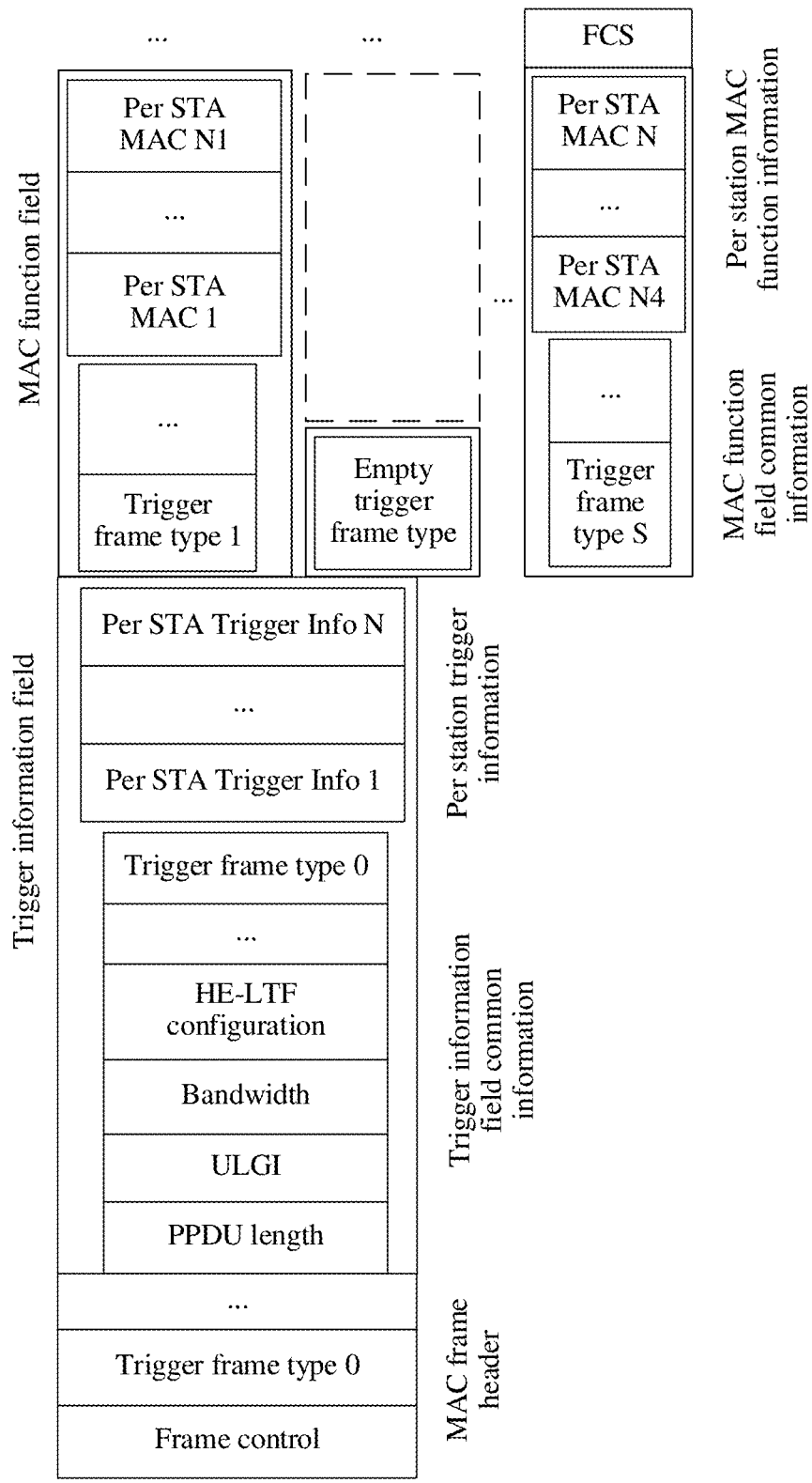
FIG. 13 is a schematic structural diagram of an eleventh trigger frame according to an embodiment of the present disclosure.

In this embodiment of the present disclosure, the AP generates the trigger frame carrying the target MAC function. The target MAC function may include a single MAC function or a plurality of MAC functions. Further, optionally, the trigger frame may indicate, in a common field, a quantity of MAC functions carried in the trigger frame, and further indicate the carried MAC function by using a trigger frame type identifier. For example, as shown in FIG. 3, if the trigger frame carries only a single MAC function, a trigger frame type field in the common field indicates the carried MAC function; or as shown in FIG. 13, if the trigger frame carries a plurality of MAC functions, all carried MAC functions may be indicated by using all trigger frame type fields in MAC function field common information.

The AP performs multiuser transmission with a plurality of STAs by using the OFDMA; that is, the AP performs the multiuser transmission with each station in the first station and each station in the second station by using the OFDMA.

The AP may indicate an uplink transmission resource to the first station and the second station by using trigger information of a per station field corresponding to each station in the trigger frame. Generally, the trigger information includes a station identifier of a station corresponding to the trigger information.

The trigger frame includes first information of the first station and second information of the second station. The first information may include first trigger information corresponding to the first station and MAC function information corresponding to the first station. The second information may include second trigger information of the second station. The first trigger information is used to indicate an uplink transmission resource of the first station, and the second trigger information is used to indicate an uplink transmission resource of the second station. Generally, the MAC function information is encapsulated in a MAC function field. The MAC function field includes a MAC function common information field and a MAC function field in the per station field. It should be noted that some MAC functions may not include either MAC function common information or the MAC function field in the per station field.

Optionally, each MAC function field in the per station field may also include an identifier of a station corresponding to the MAC function field. Each station in the first station may send, based on MAC function information in the per station field corresponding to the station, a MAC frame corresponding to a target MAC function carried in the trigger frame.

Further, the trigger frame includes indication information. The indication information is used to: instruct the first station to send the MAC frame corresponding to the target MAC function carried in the trigger frame, and instruct the second station not to perform the target MAC function. The indication information may exist in a plurality of manners, and some possible existence manners of the indication information may be described in subsequent embodiments. Certainly, the optional embodiments described in this embodiment are merely examples.

When receiving the trigger frame, each station may learn, by parsing the indication information, whether to perform the target MAC function carried in the trigger frame. If the target MAC function needs to be performed, MAC function information corresponding to the station is further parsed, and a MAC frame corresponding to the target MAC function is sent based on the MAC function information; or if the target MAC function does not need to be performed, data is sent based on trigger information corresponding to the station in the trigger frame without being limited by the target MAC function. In this way, whether each station performs the target MAC function can be flexibly controlled.

That the AP sends a trigger frame for channel detection information (TF for CSI) is used herein as an example for description. When sending the TF for CSI for the first time, the AP expects to obtain channel state information from an STA 1 and an STA 2, and when an STA 3 is scheduled, a MAC frame returned by the STA 3 is not limited. That is, the AP sends, for the first time, the trigger frame TF for CSI carrying a single MAC function to three STAs; however, the AP expects that only the STA 1 and the STA 2 perform corresponding target MAC functions, and send a beamforming report (BF Report) frame based on trigger information and MAC function information. In addition, the AP expects that the STA 3 performs only uplink transmission based on the trigger information without setting a specific limitation on a type of the returned frame.

Likewise, when the AP sends the TF for CSI for the second time, the STA 2 has sent the BF report frame. In this case, the AP may schedule only the STA 1 to send the BF report frame and sets no corresponding limitation on the STA 2 and the STA 3. To implement the function described above, in the present disclosure, indication information may be added to a sent trigger frame to instruct different STAs to perform a target MAC function. Indication information carried in the TF for CSI that is sent for the first time is different from indication information carried in the TF for CSI that is sent for the second time.

A format design of the trigger frame that carries the indication information and that is described in this embodiment of the present disclosure is described in the following embodiments.

First, the target MAC function may include a single MAC function or a plurality of MAC functions.

In an embodiment, if the target MAC function includes a single MAC function, a trigger frame type identifier is used in a trigger frame to identify the single MAC function.

Figure 4:
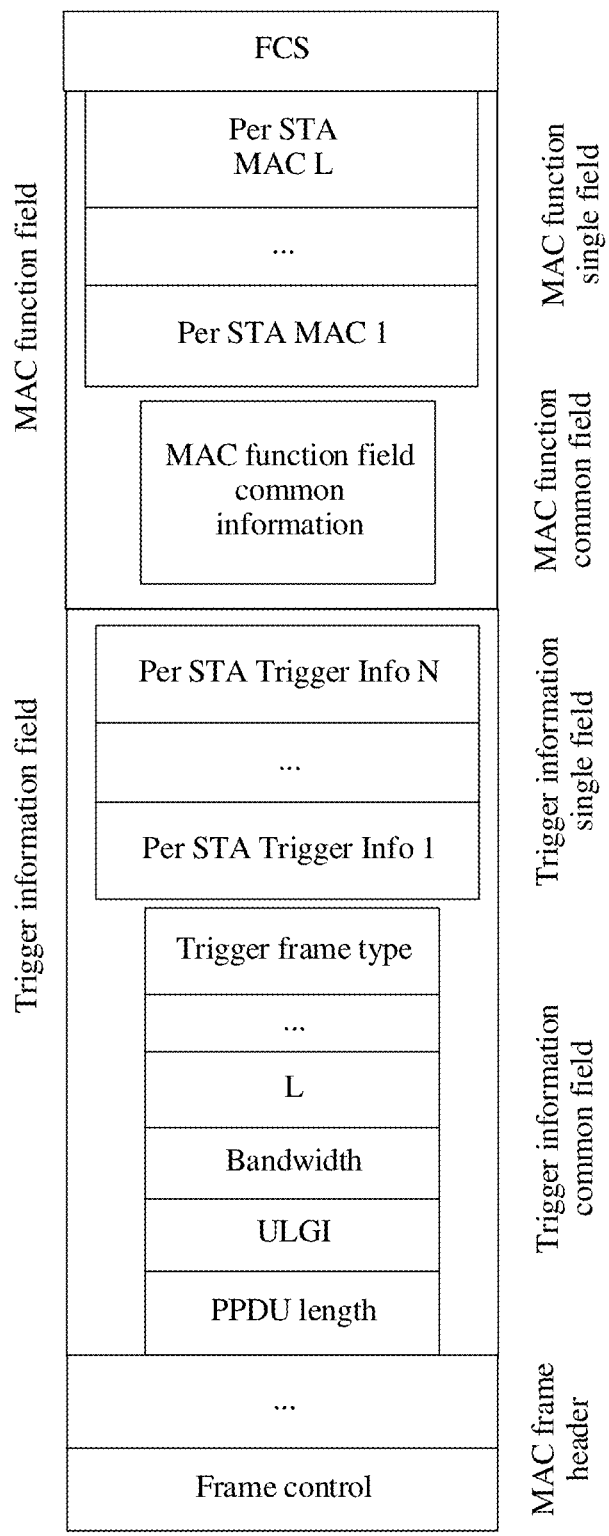
FIG. 4 is a schematic structural diagram of a second trigger frame according to an embodiment of the present disclosure.

In an optional implementation, the indication information may include an indication value that is used to represent a quantity of target stations included in the first station. The first station is a station that needs to be instructed by the AP to send a MAC frame corresponding to a target MAC function. For example, the indication information may be a quantity of target stations L included in the first station, may be a difference between a total quantity of stations N in the first station and a total quantity of stations L in the second station, or the like. As shown in FIG. 3, the indication information may be located in the common field located of the trigger frame. Further, as shown in FIG. 4, the indication information may be located in a trigger information common field of the trigger frame.

In the per station area of the trigger frame, consecutive target fields that start with a preset location and that are corresponding to a quantity of targets include the first information of the first station. The preset location may be a start location of the per station area, or may be an end location of the per station area. If the preset location is the end location, the target fields are located before the end location. The first information of the first station includes the first trigger information of the first station and the MAC function information of the first station. As shown in FIG. 3, trigger information and MAC function information of each station may be encapsulated together in a target field of the per station area of the trigger frame. Optionally, as shown in FIG. 4, trigger information and MAC function information of each station may alternatively be respectively encapsulated in a trigger information single field and a MAC function single field in the per station area. If an encapsulation manner shown in FIG. 4 is used, the target field includes two fields, which are respectively located in the trigger information single field and the MAC function single field.

In the per station area, a field other than the target field includes the second information of the second station. The second information of the second station includes the second trigger information corresponding to the second station. The second station transmits data on an uplink transmission resource specified by the second trigger information without being limited by the target MAC function carried in the trigger frame. Likewise, based on the encapsulation manner of the first information of the first station, the second information of the second station may also have two encapsulation manners shown in FIG. 3 and FIG. 4. In FIG. 3, a per station field of a per station area of the second station includes only the second trigger information. In FIG. 4, the trigger information single field of the second station includes second trigger information of each station, but the MAC function single field does not include a related MAC function field of the second station.

Specifically, optionally, as shown in FIG. 3, the trigger frame indicates, in the common field, a quantity of target stations L included in the first station. The common field further includes the MAC function field common information. It should be noted that, for some MAC functions, the MAC function field common information may not be included.

In the per station field of the per station area, L STAs (that is, each station in the first station) in N STAs include both the trigger information and the MAC function information, and other N−L STAs (that is, each station in the second station) include only the trigger information. To enable all STAs to learn which STAs include per MAC function information (an STA that includes the MAC function information needs to send a MAC frame corresponding to a target MAC function) and which STAs do not include per MAC function information (an STA that does not include the MAC function information does not need to perform the target MAC function), in this embodiment, trigger information of the L STAs (that is, the first station) including the MAC function information and the MAC function information are all arranged in foremost consecutive target fields in the per station area, and then L is indicated in the common area. In this way, the STA that needs to parse the trigger frame may learn that the per station area of the first L STAs may include the MAC function information, and the per station area of the last N−L STAs may not include the MAC function information.

Certainly, both trigger information and MAC function information of the L STAs that include the MAC function information may be placed in last consecutive target fields. In this way, the STA that needs to parse the trigger frame may learn that the per station area of first N−L STAs may not include the MAC function information, and the per station area of last L STAs may include the MAC function information. It should be noted that trigger information of each STA is encapsulated in a trigger information field of the trigger frame, and MAC function information of each STA is encapsulated in the MAC function field of the trigger frame.

It should be noted that another alternative manner may be used to indicate L; for example, N−L or L−1 is indicated. Another method that may have a same effect in indicating L is not limited in the solution of the present disclosure.

As shown in FIG. 3, information of all STAs is placed together in the per station area, so that the STA can focus on parsing content of the trigger frame.

Specifically, optionally, as shown in FIG. 4, trigger information of all the STAs (the first station and the second station are included) may appear at the same time, and then MAC function information of the first station STA appears at the same time. In this case, by indicating L and arranging the STAs in a corresponding way, the STAs may learn that trigger information single field of the per station area includes trigger information of N STAs, but a MAC function information field of the per station area may include only MAC function information of L STAs. It should be noted that in trigger information single fields, trigger information of L stations of the first station needs to be arranged in foremost target fields. When parsing the trigger information single field in the trigger frame, the STA may learn, based on a sequence and an indication value of the STA, whether the MAC function information is included, and may further learn whether the MAC frame corresponding to the target MAC function needs to be sent.

Optionally, when the indication value L=N, it indicates that all the stations are first stations; that is, all the stations need to perform the target MAC function, and send, based on MAC function information of the station, the MAC frame corresponding to the target MAC function.

When the indication value L=0, it indicates that all the stations are second stations; that is, no station needs to perform the target MAC function, and only need to send data based on trigger information corresponding to the STA.

In another optional implementation, the indication information may include an indication character. The indication character includes a first character and a second character. The first character is used to instruct a corresponding station to send the MAC frame corresponding to the target MAC function, and the second character is used to instruct a corresponding station not to perform the target MAC function. If the corresponding station needs to send the MAC frame corresponding to the target MAC function, the trigger frame needs to further include the MAC function information of the station; or if the corresponding station does not need to perform the target MAC function, the trigger frame does not include the MAC function information of the station. It should be noted that the MAC function information is encapsulated in the MAC function field; and the trigger frame may include the MAC function field, so as to ensure a unified format; however, the MAC function field may use a default value to instruct the station not to perform the target MAC function.

Specifically, optionally, the first character may be "0", and the second character may be "1". Certainly, alternatively, the first character may be "1", and the second character may be "0". This is not limited herein.

In the former optional implementation, the L STAs performing the MAC function are arranged, so that some STAs perform the MAC function, and in addition, an objective of reducing indication overheads is achieved.

In this implementation, a relatively flexible indication function may be implemented, and it is not necessary to arrange STAs. An N-bit MAC function field bitmap is introduced to perform indication for stations, or perform bit indication for each STA. The following separately describes the two implementations.

Figure 5:
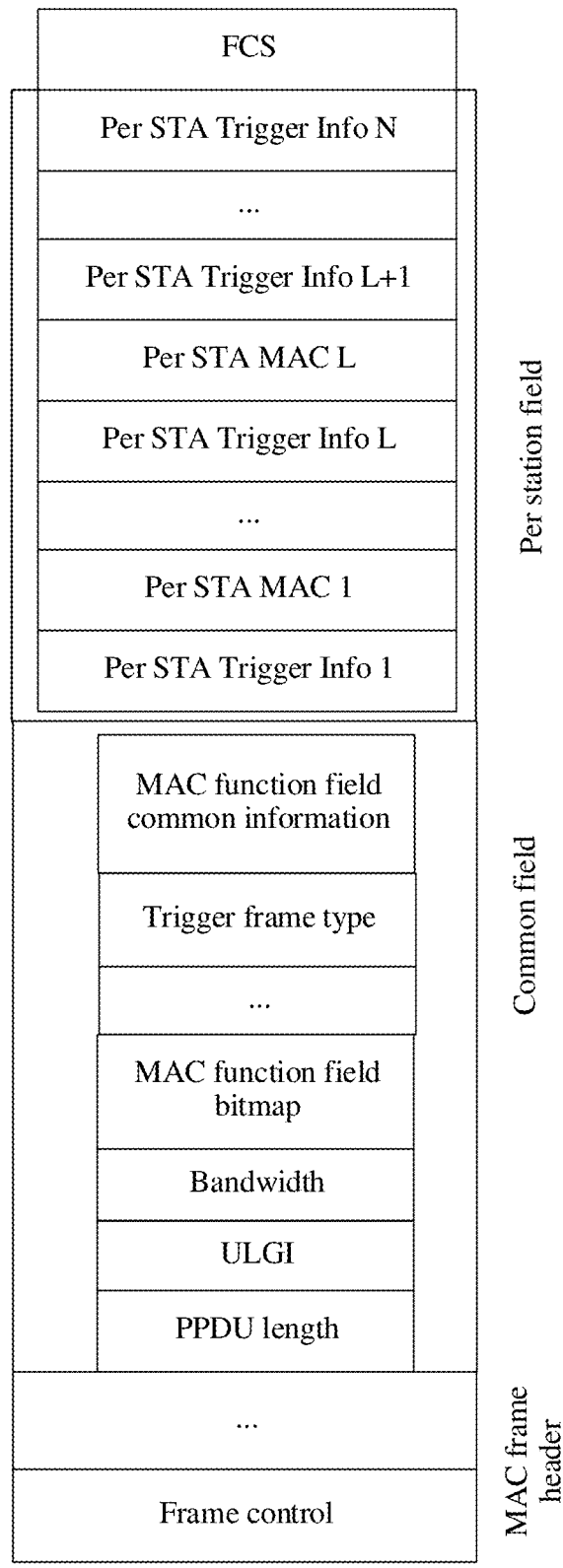
FIG. 5 is a schematic structural diagram of a third trigger frame according to an embodiment of the present disclosure.
Figure 7:
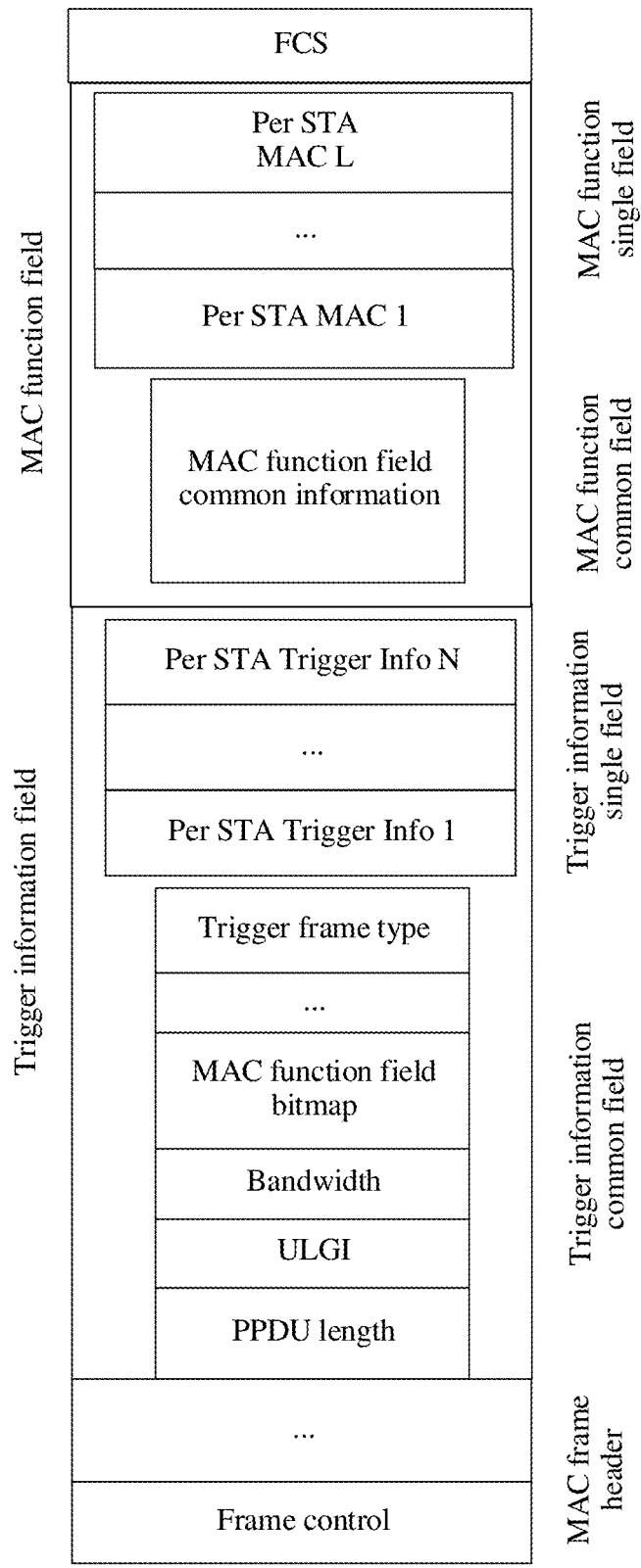
FIG. 7 is a schematic structural diagram of a fifth trigger frame according to an embodiment of the present disclosure.

Optionally, as shown in FIG. 5 and FIG. 7, the bitmap is used to notify each STA whether the per station field of the per station area of the STA includes both trigger information and MAC function information. A quantity of bits included in the bitmap is a total quantity of stations included in the first station and the second station.

Optionally, if a station includes the MAC function information, the per station field of the station includes the MAC function field. Actually, each character in the bitmap is used to indicate whether each per station field in the per station area includes the MAC function field.

As shown in FIG. 5, the MAC function bitmap is located in the common field, each per station field of the per station area includes information of each station, and the information is trigger information and MAC function information of the first station, or the information is trigger information of the second station. It should be noted that a sequence of all stations indicated in the bitmap needs to be consistent with an arrangement order of all stations in a per station area.

Optionally, for example, 1 is used to indicate that a per station field of an STA includes both trigger information and MAC function information, and 0 is used to indicate that a per station field of an STA includes only the trigger information. In an N-bit indication, L bits may be 1, which indicates that a per station field of L STAs includes both the trigger information and the MAC function information; and N−L bits may be 0, which indicates that a per station field of N−L STAs includes only the trigger information. Certainly, alternatively, 0 and 1 may indicate an opposite meaning. This is not limited in the solution of the present disclosure.

If 10 STAs in total need to be scheduled, a per station field of the first, the fourth, the fifth, and the sixth STA includes both the trigger information and the MAC function information, and a per station field of other STAs includes only the trigger information. Correspondingly, N=10, and L=4. If the MAC function field bitmap is used for indication, it is indicated as 1001110000. A sequence in the bitmap represents a sequence of all STAs.

As shown in FIG. 7, the MAC function bitmap is located in a trigger information common field, trigger information of all stations exists as a trigger information single field, and MAC function information of all the stations exists as a MAC function single field. It should be noted that an arrangement order of all stations in the trigger information single field and the MAC function information single field needs to be consistent with a sequence of all stations indicated by all characters in the MAC function bitmap.

Optionally, if all bits in the bitmap are set to 1s, it indicates that all stations are first stations; that is, all the stations need to perform the target MAC function, and send the MAC frame corresponding to the target MAC function based on the MAC function information of the station.

If all the bits in the bitmap are set to 0s, it indicates that all the stations are second stations; that is, no station needs to perform the target MAC function, and each station needs to send only data based on the trigger information of the station.

Figure 6:
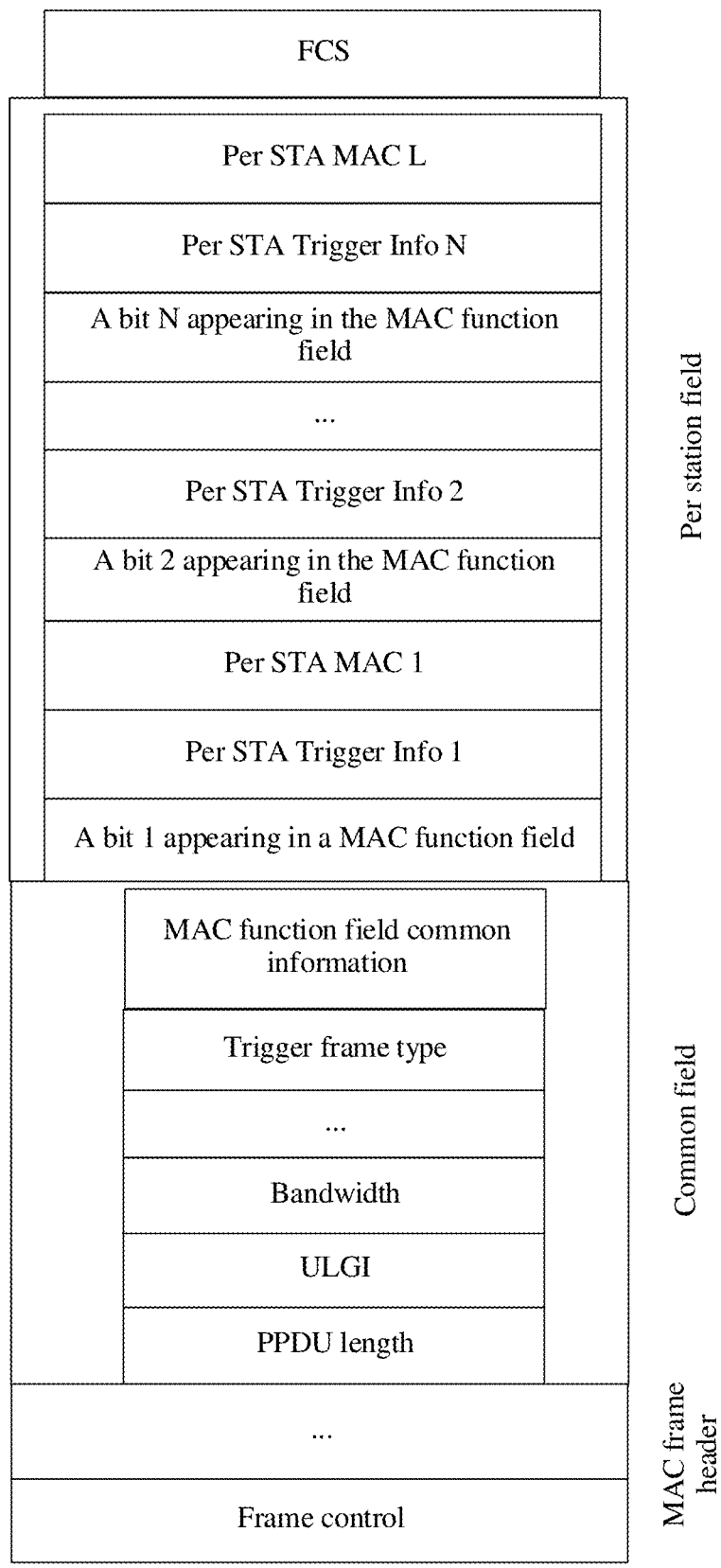
FIG. 6 is a schematic structural diagram of a fourth trigger frame according to an embodiment of the present disclosure.
Figure 8:
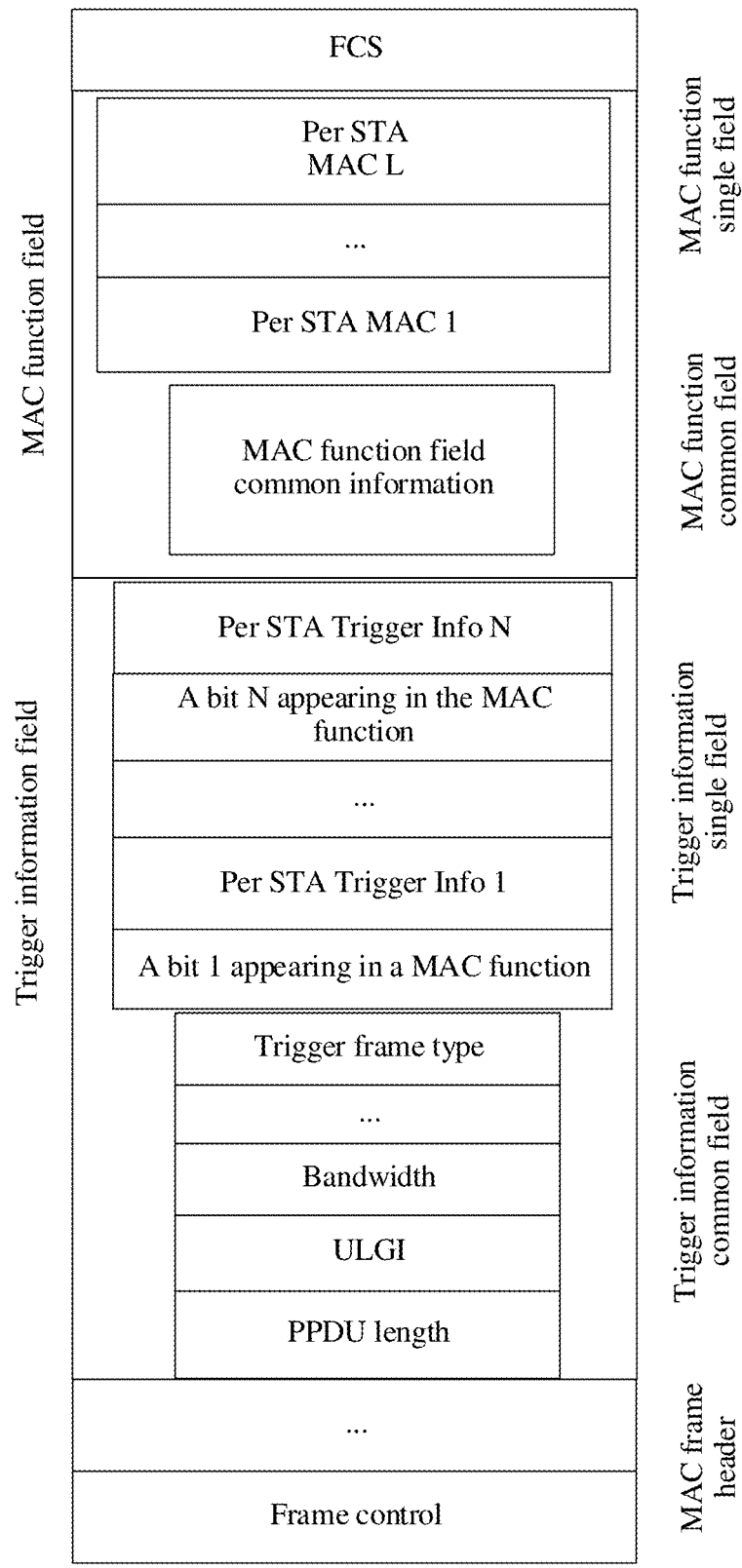
FIG. 8 is a schematic structural diagram of a sixth trigger frame according to an embodiment of the present disclosure.

Optionally, as shown in FIG. 6 and FIG. 8, MAC function performing indication is performed for a station corresponding to each field in a per station area.

As shown in FIG. 6, the indication character may be located in each station field of the per station area, and is used to indicate whether a station corresponding to the station field includes the MAC function information. If the MAC function information is included, the station needs to send, based on the MAC function information, the MAC frame corresponding to the target MAC function.

Optionally, as shown in FIG. 6, for example, 1 is used to indicate that a per station field of an STA includes both trigger information and MAC function information, and 0 is used to indicate that a per station field of an STA includes only the trigger information.

If MAC function information bit indication is performed for each STA, 10 STAs in total need to be scheduled, where a per station field of the first, the fourth, the fifth, and the sixth STA includes both the trigger information and the MAC function information, and a per station field of other STAs includes only the trigger information. An indication of bit "1" exists in the per station field of the first, the fourth, the fifth, and the sixth STA, and an indication of bit "0" exists in the other STAs.

As shown in FIG. 8, trigger information and MAC function information of all stations are separately encapsulated, that is, the trigger information of all the stations is encapsulated in the trigger information single field, and the MAC function information of the first station is encapsulated in the MAC function single field.

Optionally, the indication character is located in the trigger information single field, and trigger information single field of each station may include a 1-bit indication character for indication. If 10 STAs in total need to be scheduled, where the per station field of the per station area of the first, the fourth, the fifth, and the sixth STA includes both the trigger information and the MAC function information, and a per station field of other STAs includes only the trigger information. One bit may exist in a per station trigger information field of the second, the third, the seventh, the eighth, the ninth, and the tenth STAs for indicating 0; and one bit may exist in the per station trigger information field of the first, the fourth, the fifth, and the sixth STAs for indicating 1.

In another optional implementation, the indication information may include a length of a per station field corresponding to each station in a per station area. It should be noted that in this manner, the target MAC function does not need to be performed, and therefore, a per station field corresponding to the second station does not include the MAC function field.

In this embodiment, in addition to indicating a per station field of each per station area by using a 1-bit indication character, an indication method in which a length of a per station field corresponding to a per station area of each STA is indicated may also be directly used. Each STA determines, by parsing a length of a station field corresponding to the STA in the trigger frame, whether the target MAC function needs to be performed.

For example, a length of a per station area that includes both a per station trigger information field and a per station MAC function field is indicated as L1+L2, and a length of a per station area that includes only a per station trigger information field is indicated as L1. Certainly, a more flexible length indication may be used to indicate a length of each per station area. An advantage of the method is that the indication is more flexible; however, a disadvantage of the method is that overheads of the length indication are relatively high. It should be noted that a length unit of the station field may be bit (s).

In addition, the indication method in which a length of a per station field in a per station area is indicated may also be replaced by another indication method. For example, if a length of a per station area of each STA is at least L3, the length may be directly indicated as L−L3 when the length is indicated. If a station field includes both a per station trigger information field and a per station MAC function field, a length of the station field is indicated as L1+L2−L3. For a length of a per station field that includes only a per station trigger information field, a length of the per station field is indicated as L1−L3.

Certainly, a type of each station field in a per station area may be indicated for each STA, or indexing is performed by length. Another method that may be used to achieve a same effect in indicating a length is not limited in the solution of the present disclosure.

Optionally, length indication may be separately performed for each STA in each station field of a per station area. That is, as shown in FIG. 9, a length of a station field of each station is indicated in a per station field of a per station area.

In this embodiment, if the station is the first station, a per station field of one station includes length indication information of the station, trigger information of the station, and MAC function information of the station; or if the station is the second station, a per station field of one station includes length indication information of the station and trigger information of the station. Generally, a length of trigger information of a station is constant, and therefore, the STA may determine, based on a length of a per station field, whether a station corresponding to the station field needs to perform the target MAC function.

Figure 9:
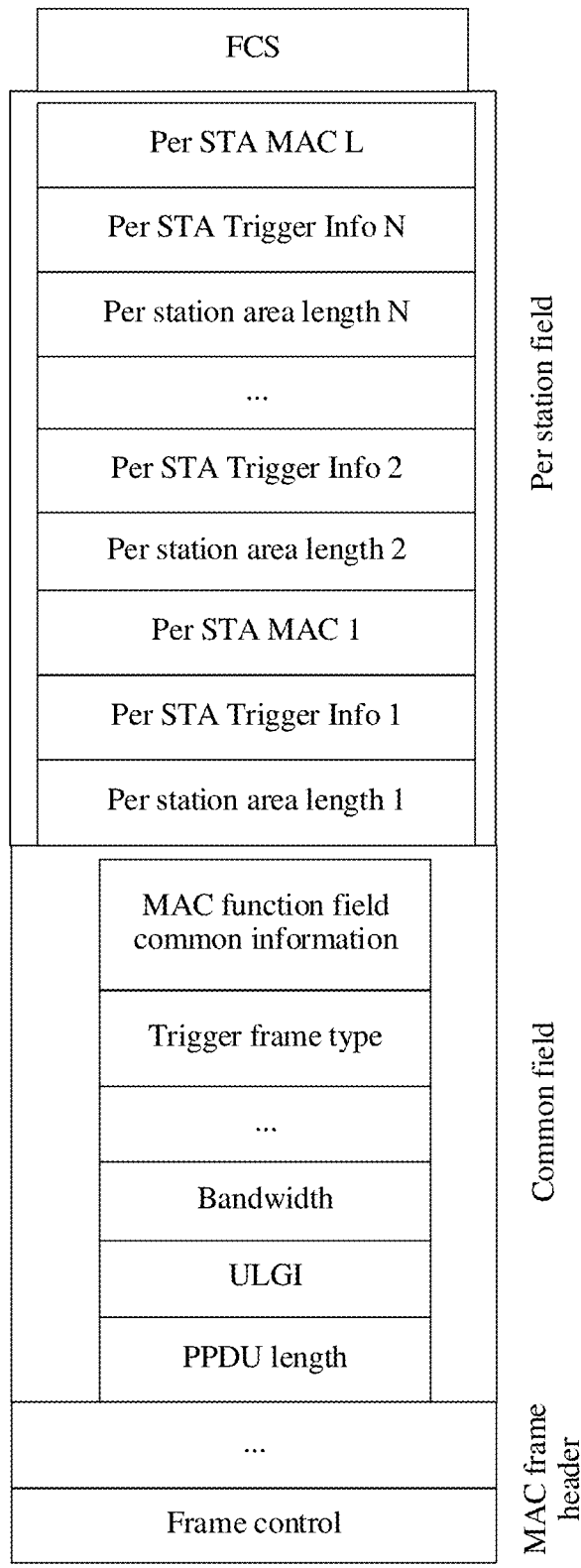
FIG. 9 is a schematic structural diagram of a seventh trigger frame according to an embodiment of the present disclosure.

The STA may parse, by using a trigger frame structure shown in FIG. 9, all information of the station field corresponding to the STA. If the station is the first station, the station may parse both the trigger information and the MAC function information of the station; or if the station is the second station, the station may parse the trigger information of the station.

Figure 10:
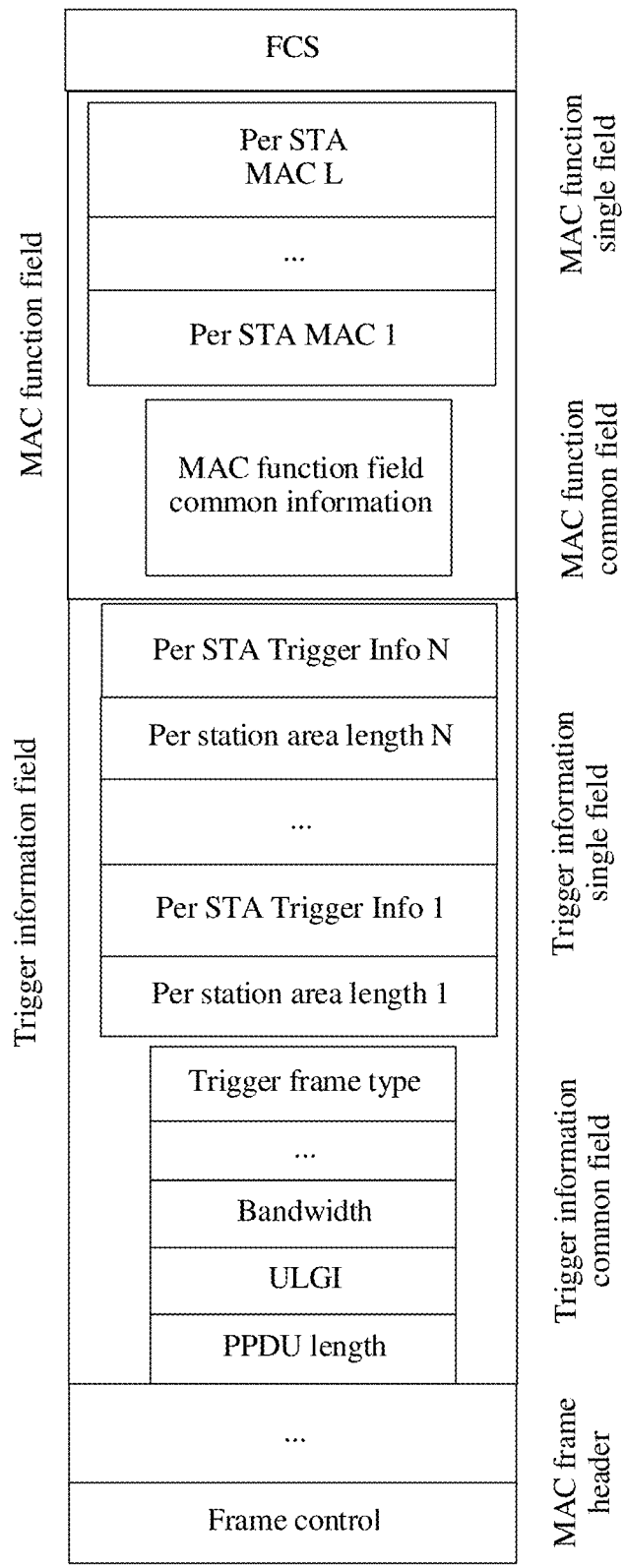
FIG. 10 is a schematic structural diagram of an eighth trigger frame according to an embodiment of the present disclosure.

Optionally, the length indication may be in each field of the trigger information single field. As shown in FIG. 10, in this embodiment, per station trigger information of all stations is encapsulated in the trigger information single field, and per station MAC function information of the first station is encapsulated in the MAC function single field.

As shown in FIG. 10, in the trigger information single field, each station field includes only trigger information of each station, and in addition, a length of a per station field corresponding to the station is indicated in each station field of the trigger information single field. A per station field includes the trigger information field and the MAC function field of the station.

An STA may determine, based on a parsed length value, whether the STA includes the MAC function information. If the STA includes the MAC function information, MAC function information corresponding to the station needs to be obtained from the MAC function single field, and the MAC frame corresponding to the target MAC function is sent based on the MAC function information. It should be noted that an arrangement order of MAC function information of all stations in the MAC function single field may be the same as or different from an arrangement order of trigger information of all stations in the trigger information single field. If the arrangement orders are different, a station identifier corresponding to the MAC function field needs to be identified in each MAC function field of the MAC function single field, so that the STA finds corresponding MAC function information from the MAC function single field.

Figure 11:
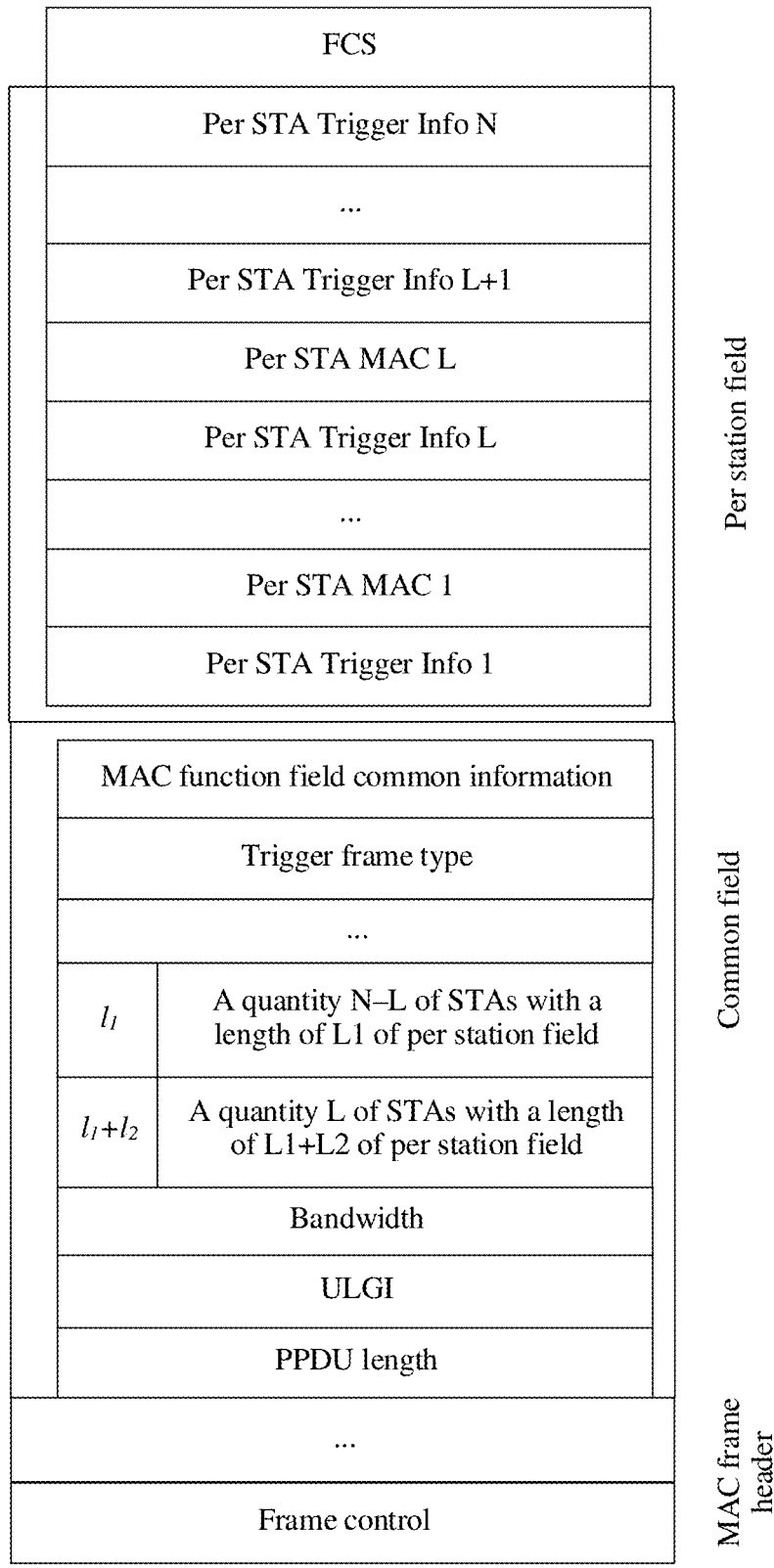
FIG. 11 is a schematic structural diagram of a ninth trigger frame according to an embodiment of the present disclosure.

Optionally, lengths may alternatively be indicated together. As shown in FIG. 11, it is indicated in the common field of the trigger frame that a quantity of STAs with a per station field length of L1+L2 is L, and a quantity of STAs with a per station field length of L1 is N−L. L1 is used to represent a length of the trigger information field, and L2 is used to represent a length of the MAC function field.

It should be noted that a per station field in a per station area needs to be arranged based on a length indicated in the common field; that is, a per station field corresponding to the first station including both the trigger information and the MAC function information needs to be arranged in the first part, and a per station field corresponding to the second station including only the trigger information needs to be arranged in the last part.

Further, the length indication method may be used to instruct a trigger frame carrying a single MAC function, and may also be used to instruct a trigger frame carrying a plurality of MAC functions. When a length of a per station field is merely equal to a length of the trigger information field, the scheduled STA does not need to perform a corresponding target MAC function. When a length of a per station field is greater than the length of the trigger information field, it indicates that the scheduled STA needs to send the MAC frame corresponding to the target MAC function.

It should be noted that in the foregoing method in which a length is used for indication, a length unit may be bit.

Optionally, if a length indication value of a per station field of all stations is greater than a length of per station trigger information, it indicates that all the stations are first stations; that is, all the stations need to perform the target MAC function carried in the trigger frame, and each station sends, based on MAC function information of the station, the MAC frame corresponding to the target MAC function.

If a length indication value of a per station field of each station is equal to the length of per station trigger information, it indicates that all the stations are second stations; that is, no station needs to perform the target MAC function, and each station sends data based on the trigger information of the station.

In another optional implementation, the indication information may be a default value. In this embodiment, the default value is used to instruct a corresponding STA not to perform the target MAC function.

In several optional implementations described above, MAC function fields of some STAs are not carried, and some extra indications are used, so as to achieve an effect that some STAs (that is, the second station) do not perform the target MAC function.

Specifically, a per station field of an STA that does not need to perform the target MAC function does not carry the MAC function field, so as to reduce overheads. In this embodiment, the STA that does not perform the target MAC function also carries the MAC function field, so as to ensure a unified format. However, to enable the STA to learn whether to perform the MAC function, in addition to using the indication method described above (for example, indication is performed by using the indication character), the indication method that is based on a default value and that is provided in this embodiment may alternatively be used; that is, a value of a MAC function field of a per station area of an STA that does not need to perform the target MAC function is set to the default value.

Figure 12:
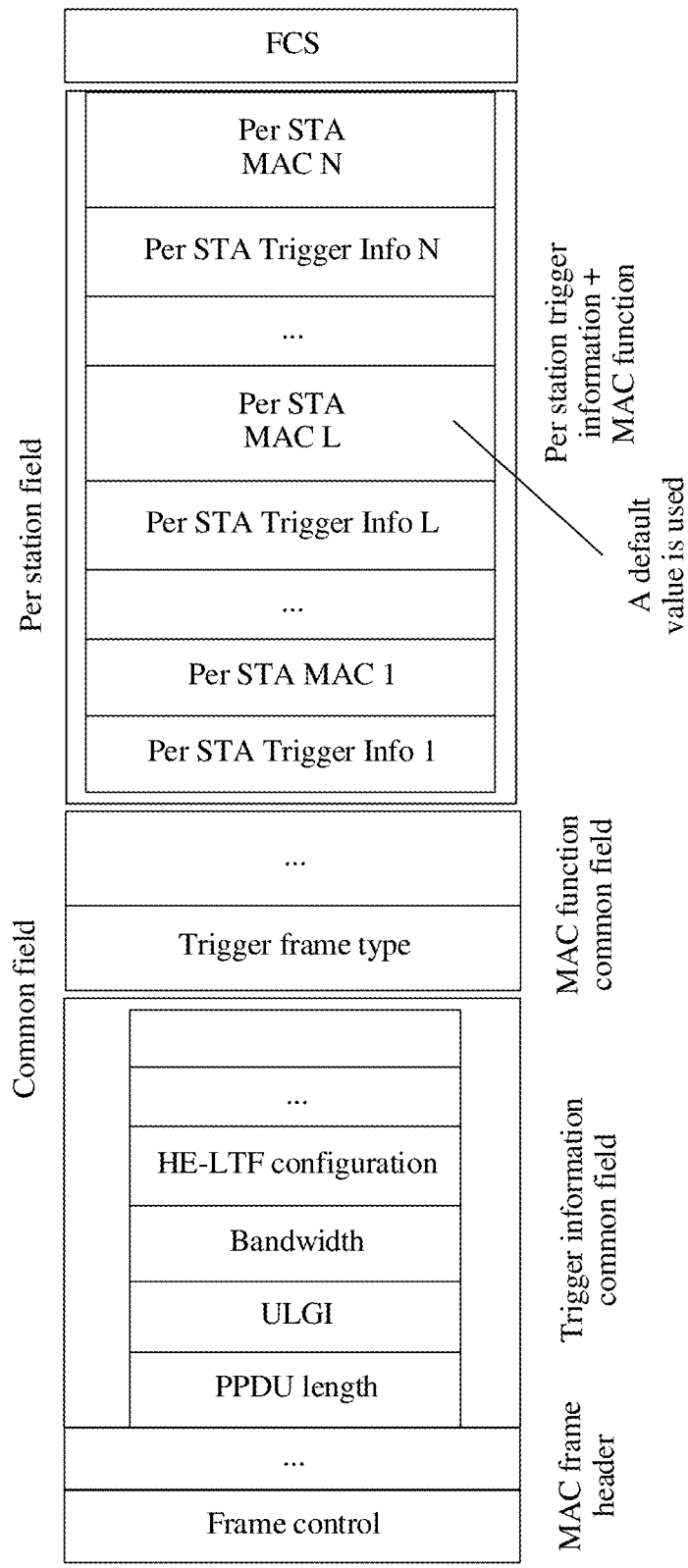
FIG. 12 is a schematic structural diagram of a tenth trigger frame according to an embodiment of the present disclosure.

That L STAs in N STAs need to perform the target MAC function is still used as an example herein for description. N−L STAs do not need to perform the target MAC function. A per station field of the N STAs includes a per station trigger information field and a per station MAC function field. As shown in FIG. 12, a difference is that some or all bits of a per station MAC function field of the N−L STAs that do not need to perform the target MAC function are a default value. The default value is used to instruct the STAs not to perform the target MAC function. It should be noted that in a per station area according to this embodiment, information of the first station and information of the second station do not need to be arranged based on whether the MAC function information is carried.

Optionally, the MAC function field may carry one or more reserved bits (Reserved bit (s)) to represent the default value. Further, optionally, the reserved bit may be set to a non-reserved value (for example, changing from a reserved value of 0 to 1, or changing from a reserved value of 1 to 0). When finding, through parsing, that a reserved bit of the MAC function field is a non-reserved value, the STA does not need to perform the target MAC function; or when finding, through parsing, that the reserved bit of the MAC function field is a reserved value, the STA needs to perform the target MAC function.

Further, optionally, some sub-fields of the MAC function field are not used for indication; that is, indications of some sub-fields are reserved. Therefore, the sub-fields may be indicated as reserved conditions. When finding that a sub-field of the MAC function field is indicated as a non-reserved condition, the STA needs to perform the target MAC function; or when finding that a sub-field of the MAC function field is indicated as a reserved condition, the STA does not need to perform the target MAC function.

The TF for CS trigger frame sent by the AP is used as an example herein for description. The TF for CSI may carry an 8-bit segment retransmission bitmap field included in a BF Report poll to notify the STA which segments further need to be transmitted. In actual transmission, the AP sets a bit corresponding to a required segment to 1. Currently, a condition in which all bits are set to 0 is not used. Therefore, for the indication, all the bits may be set to 0 to indicate that the STA does not need to perform the target MAC function. The STA that does not need to perform the target MAC function may send a MAC frame of any type.

Further, optionally, some bit combinations are specially reserved in the MAC function field to indicate that the MAC function does not need to be performed. When finding, through parsing, that the bit of the MAC function field is a non-reserved bit combination, the STA does not need to perform the target MAC function; or when finding, through parsing, that the bitmap of the MAC function field is a reserved bit combination, the STA needs to perform the target MAC function. For example, if MAC function fields of an STA are all 0s or all 1s, the STA does not need to perform the target MAC function; or if MAC function fields of an STA are not all 0s or all 1s, the STA needs to perform the corresponding target MAC function.

As shown in FIG. 12, FIG. 12 is a schematic structural diagram of a trigger frame in which a default value is used to instruct an STA whether to perform a target MAC function according to an embodiment of the present disclosure. As shown in the figure, a per station area of the trigger frame includes all per station fields of all stations, and each per station field includes a trigger information field and a MAC function field of one STA. Indication information is encapsulated in a MAC function field of a station that does not need to perform the target MAC function. The indication information is a default value. When learning, through parsing, that a MAC function field of a per station field corresponding to the STA includes the default value, the STA determines that the target MAC function needs to be performed, that is, a MAC frame corresponding to the target MAC function needs to be sent based on MAC function information in the MAC function field corresponding to the station.

Optionally, if some or all bits of MAC function fields of all stations are indicated as non-default/reserved bits, it indicates that all the stations are first stations; that is, all the stations need to perform the target MAC function, and each station sends, based on the MAC function information of the station, the MAC frame corresponding to the target MAC function.

If some or all bits of the MAC function fields of all the stations are indicated as default/reserved bits, it indicates that all the stations are second stations; that is, no station needs to perform the target MAC function, and each station sends data based on trigger information of the station.

In another embodiment, the target MAC function may include a plurality of MAC functions, that is, the trigger frame carries a plurality of MAC functions. A MAC function common field of the trigger frame that carries a plurality of MAC functions includes a plurality of fields, each field includes one trigger frame type indication, and one trigger frame type indication is corresponding to one MAC function, so that different STAs can be scheduled at the same time to respond, based on different trigger frame types, with MAC frames corresponding to different MAC functions.

When a format of the trigger frame that carries a plurality of MAC functions is designed, it also needs to be implemented that some STAs do not perform the MAC function, and some STAs send the MAC frame corresponding to the MAC function.

Figure 14:
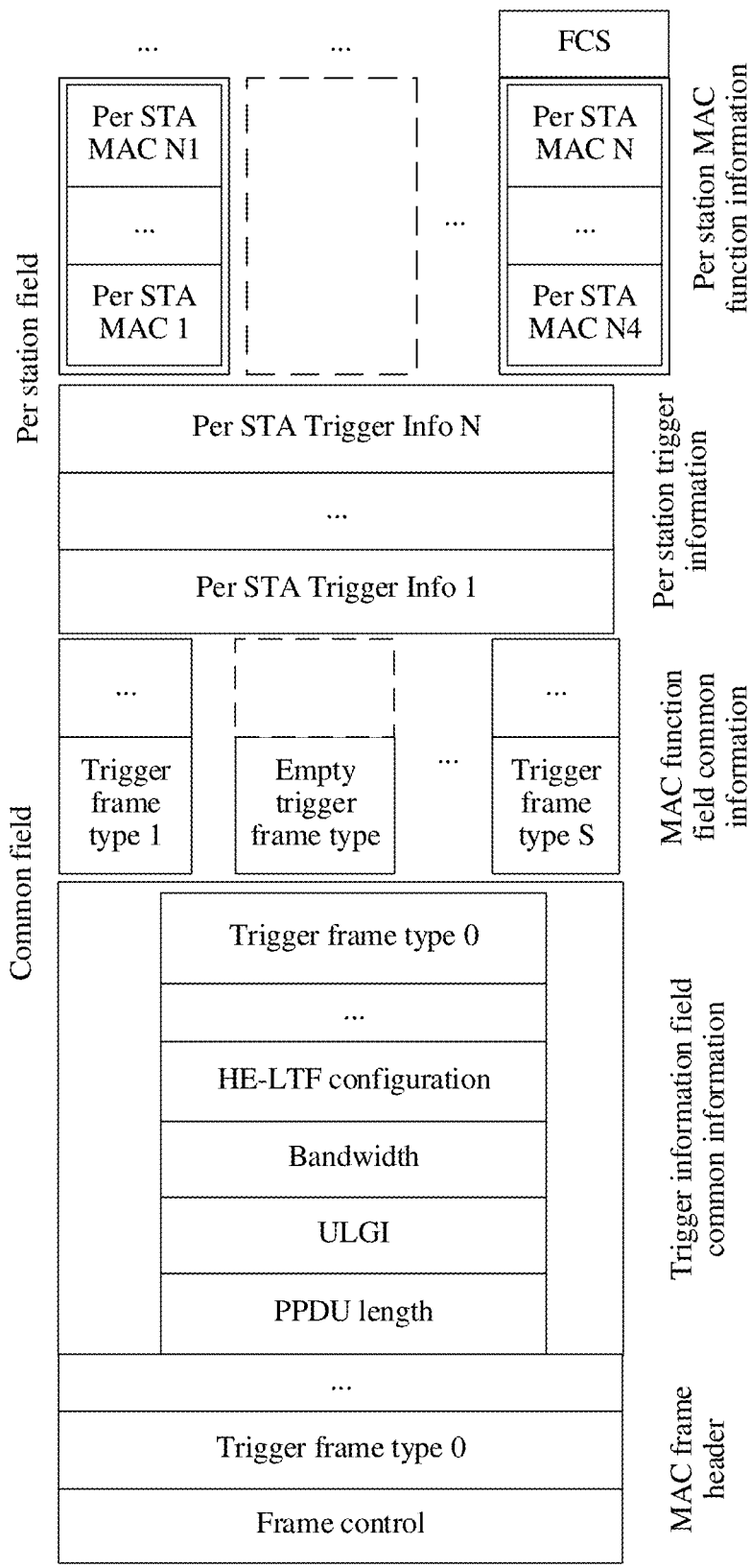
FIG. 14 is a schematic structural diagram of a twelfth trigger frame according to an embodiment of the present disclosure.
Figure 15:
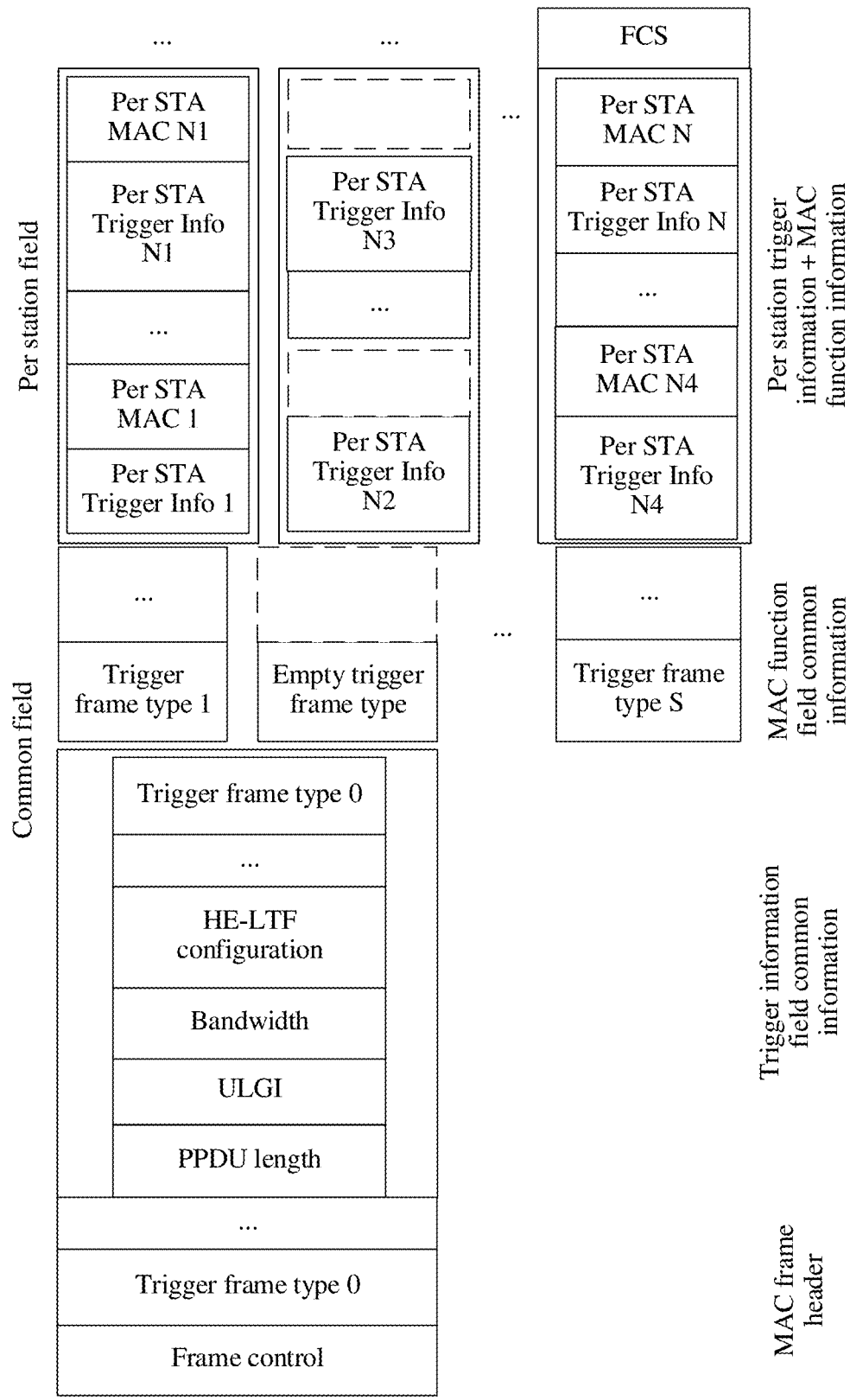
FIG. 15 is a schematic structural diagram of a thirteenth trigger frame according to an embodiment of the present disclosure.

Optionally, in this embodiment, an empty trigger frame type is used to indicate the STA that does not need to perform the MAC function; that is, the STA that does not need to perform the target MAC function is corresponding to the empty trigger frame type. As shown in FIG. 13 to FIG. 15, FIG. 13 to FIG. 15 are schematic structural diagrams of several possible trigger frame structures according to an embodiment of the present disclosure.

A main difference among FIG. 13 to FIG. 15 is that a sequence of all fields is different. It should be noted that a trigger frame type 0 is used to indicate that the trigger frame does not carry the MAC function, carries a single MAC function and a type of the single MAC function, or carries a plurality of MAC functions.

It should be noted that when a plurality of MAC functions exist, trigger frame types 1-S indicate types of all MAC functions. Optionally, the trigger frame type 0 may be not used, and the trigger frame types 1-S may be directly used to indicate, in chain in each MAC trigger frame type field, whether a next trigger frame type exists. If the trigger frame does not carry the MAC function, the first trigger frame type is the empty trigger frame type, and a next trigger frame type does not exist.

In this embodiment, the empty trigger frame type is mainly used to instruct some STAs not to perform the target MAC function. When a type of a trigger frame is indicated as empty, a per station field of the STA may not carry a per station MAC function field of the STA, and in addition, may not carry MAC function field common information of the STA.

As shown in FIG. 13, FIG. 13 is a schematic structural diagram of a trigger frame according to an embodiment of the present disclosure. As shown in the figure, in this embodiment, per station trigger information of each station is encapsulated in a trigger information field. A MAC function field includes a MAC function common field and a per station MAC function field. The MAC function common field is used to encapsulate each trigger frame type, and a per station MAC function field is used to encapsulate MAC function information of each station. It should be noted that an empty trigger frame type is corresponding to a station that does not perform a target MAC function.

As shown in FIG. 13, MAC function information of a first station (that is, a station that needs to perform a corresponding MAC function) is encapsulated in each field of a per station MAC function field. Further, MAC function information of the STA is encapsulated in a trigger frame type field corresponding to a MAC function that needs to be performed. For example, STA1-STAN1 perform a MAC function indicated by a trigger frame type 1, and MAC function information of STA1-STAN1 is encapsulated in a per station MAC function field corresponding to the trigger frame type 1. A remaining STA that does not encapsulate the MAC function information is corresponding to the empty trigger frame type; that is, the STA does not need to perform a corresponding MAC function. In this way, different STAs are instructed to perform different MAC functions; and in addition, some STAs may be instructed not to perform a corresponding MAC function, that is, data may be directly sent based on trigger information.

It should be noted that in this embodiment, a per station trigger information field is located before the MAC function common field, and the MAC function common field is located before a per station MAC function field.

As shown in FIG. 14, FIG. 14 is a schematic structural diagram of another trigger frame according to an embodiment of the present disclosure. As shown in the figure, a MAC function common field of the trigger frame includes each trigger frame type field, trigger information of each station is encapsulated in a per station trigger information field, and per station MAC function information is encapsulated in a per station MAC function field. In addition, the MAC function common field is located before a per station trigger information field, and a per station trigger information field is located before a per station MAC function field. If an STA does not include corresponding MAC function information, the station is corresponding to an empty trigger frame type.

As shown in FIG. 15, FIG. 15 is a schematic structural diagram of another trigger frame according to an embodiment of the present disclosure. As shown in the figure, a trigger frame in this embodiment includes a MAC function common field and a per station field. The MAC function common field is used to indicate various trigger frame types, which include an empty trigger frame type. A per station field is used to encapsulate information of each station, for example, trigger information and MAC function information of a first station, or trigger information of a second station.

Specifically, optionally, information about a station corresponding to the trigger frame type is encapsulated in a per station field corresponding to each trigger frame type of the trigger frame. A station corresponding to the empty trigger frame type is a station that does not carry MAC function information, that is, a station that does not perform a target MAC function.

It should be noted that a per station field of each station may still carry a corresponding MAC function field, so as to ensure a unified format.

Further, if a maximum value of S is limited to be 2, an effect described in the previous embodiment may be achieved by setting a trigger frame type 1 to a type of trigger frame, and setting a trigger frame type 2 to the empty trigger frame type, that is, the trigger frame carries only one MAC function, and only some STAs are scheduled to perform the MAC function.

If trigger frame types of all stations are indicated as a non-empty trigger frame type, it indicates that all the stations are first stations; that is, all the stations need to perform the target MAC function, and each station sends, based on MAC function information of the station, a MAC frame corresponding to the target MAC function.

If the trigger frame types of all the stations are indicated as the empty trigger frame type, it indicates that all the stations are second stations; that is, no station needs to perform the target MAC function, and each station sends data based on trigger information of the station.

S201. The access point sends the trigger frame.

In this embodiment of the present disclosure, the AP sends an encapsulated trigger frame. The trigger frame carries a target MAC function, and the target MAC function includes one MAC function or a plurality of MAC functions. An STA within a coverage area of the AP may receive the trigger frame, parse the trigger frame, and obtain trigger information of the STA to determine an uplink transmission resource.

Further, the STA further needs to determine, based on the trigger frame, whether the target MAC function carried in the trigger frame needs to be performed. If the target MAC function needs to be performed, the STA further needs to parse the trigger frame to obtain MAC function information of the STA, and send, based on the MAC function information, the MAC frame corresponding to the target MAC function. The MAC function information may include some MAC parameters. For different STAs, MAC function parameters may be different.

Optionally, when parsing the trigger frame, the STA may perform a search by using an STA identifier of the STA. In the trigger frame, a trigger information field or a MAC function field may carry an identifier of a station corresponding to the trigger information or MAC function information.

Further, optionally, after receiving and parsing the trigger frame, the STA needs to determine whether to perform carrier sense before performing uplink transmission.

Generally, the AP and the STA need to perform carrier sensing (CS) before transmitting data, that is, detect whether a channel is idle. If the channel is idle, data transmission is performed; or if the channel is not idle, the data transmission is not performed, so as to prevent a transmission collision.

However, in some cases, for example, when the AP sends a data frame, and the STA responds with an acknowledgement frame, the STA may directly respond with the acknowledgement frame with no need to perform the CS. For another example, when the AP sends a beamforming report polling BF Report poll frame, and triggers the STA to respond with a BF Report frame, the STA also does not need to perform the CS.

However, according to a new specification that is introduced into 802.11ax, before the AP sends the trigger frame to trigger the STA to perform the uplink transmission, the STA needs to perform the carrier sense in some cases and does not need to perform the carrier sense in other cases. In some cases, CS needs to be performed for a response frame corresponding to the trigger frame, and a main reason is that a dense scenario is considered in 802.11ax, uplink multiuser transmission is introduced, and a plurality of STAs may send the response frame at the same time.

Considering a difference between an existing standard and the existing specification, in this embodiment, a quantity of scheduled stations is introduced as a criterion for determining whether the STA needs to perform the CS in uplink transmission; that is, the AP sends the trigger frame to trigger the STA to perform the uplink multiuser transmission, and the STA determines on its own, by using specific information in the trigger frame or based on a preset factor, whether the CS needs to be performed before uplink data transmission. The specific information or a factor used for the determining by the STA on its own includes at least a factor K, and the factor K is a quantity of stations scheduled by the trigger frame of the AP at this time.

Currently, whether the STA performs the CS is considered in two dimensions: First, the AP instructs, by carrying the specific information in the trigger frame, the STA whether to perform the CS before receiving the trigger frame and transmitting data; and second, the STA determines, based on information of the trigger frame and some preset rules, whether the CS needs to be performed. This embodiment is applicable to any case described above.

The introduced rule K is: When a quantity of scheduled stations is less than a threshold, the STA does not need to perform the CS; or when a quantity of scheduled stations is greater than a threshold, the STA needs to perform the CS.

In addition, optionally, if a plurality of factors 1-N exist, and this priority exists: a factor 1>a factor 2> . . . >a factor N, when it is determined, based on factors 1, 2, . . . , K−1, that the CS needs to be performed:

When it is determined, based on a factor K, that the CS does not need to be performed, the STA is instructed not to perform the CS.

When it is determined, based on a factor K, that the CS needs to be performed, the STA is instructed not to perform the CS.

When it is determined, based on factors 1, 2, . . . , N, that the CS needs to be performed, the STA is instructed to perform the CS.

If a plurality of factors 1-N exist, and this priority exists: a factor 1>a factor 2> . . . a factor N, when it is determined, based on factors 1, 2, . . . , K−1, that the CS does not need to be performed, the STA is instructed not to perform the CS.

If K=1 and another factor L>1 exists, and this priority exists: a factor 1>a factor 2> . . . a factor N, when it is determined, based on factors 1, 2, . . . , L, that the CS needs to be performed:

When it is determined, based on the factor L, that the CS does not need to be performed, the STA is instructed not to perform the CS.

When it is determined, based on the factor L, that the CS needs to be performed, the STA is instructed not to perform the CS.

If K=1 and another factor L>1 exists, and this priority exists: a factor 1>a factor 2> . . . a factor N, when it is determined, based on factors 1, 2, . . . , L, that the CS needs to be determined, the STA is instructed not to perform the CS.

In this embodiment of the present disclosure, the access point generates the trigger frame carrying the target MAC function, and the trigger frame includes the indication information. The indication information is used to instruct the first station to send the MAC frame corresponding to the target MAC function, and is used to instruct the second station not to perform the target MAC function. That is, a MAC frame type sent by the second station is not limited, and data sending manners of the first station and the second station can be flexibly controlled.

Figure 16:
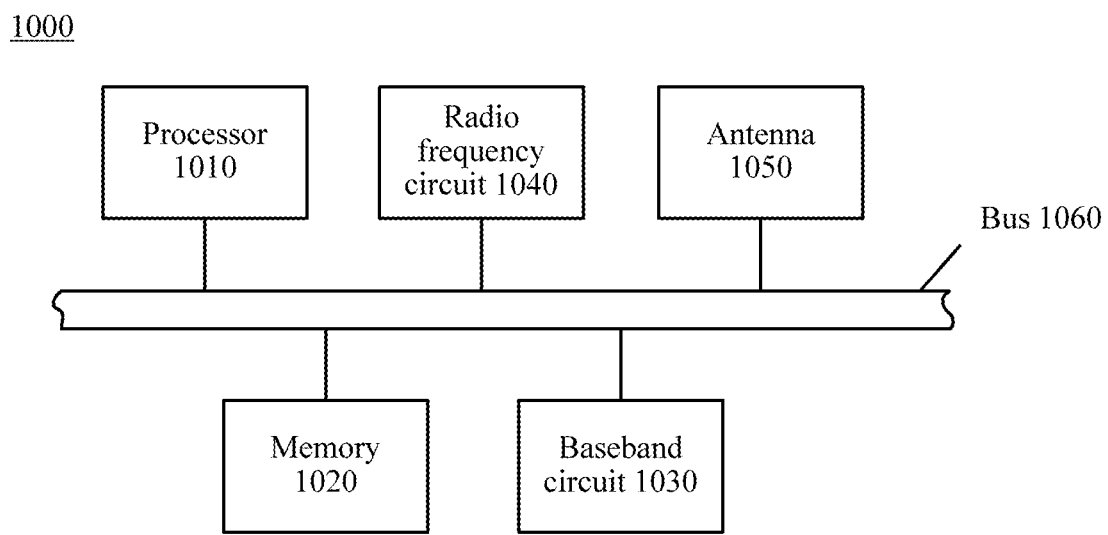
FIG. 16 is a schematic structural diagram of an apparatus for transmitting a trigger frame in a wireless local area network according to an embodiment of the present disclosure.

Referring to FIG. 16, FIG. 16 is a schematic block diagram of a trigger frame transmission apparatus in a wireless local area network according to an embodiment of the present disclosure. For example, the data transmission apparatus is an access point, or a dedicated circuit or a chip that implements a related function. The access point 1000 includes a processor 1010, a memory 1020, a baseband circuit 1030, a radio frequency circuit 1040, and an antenna 1050. The trigger frame transmission apparatus may be an AP shown in FIG. 1c. The AP communicates with an STA 1, an STA 2, and an STA 3.

Specifically, the processor 1010 controls operation of the access point 1000. The memory 1020 may include a read-only memory and a random access memory, and provides instructions and data for the processor 1010. The processor may be a general purpose processor, a digital signal processor, an application-specific integrated circuit, a field programmable gate array, or another programmable logic device. A part of the memory 1020 may further include a nonvolatile random access memory (NVRAM). The baseband circuit 1030 is configured to: combine baseband signals to be transmitted or decode a received baseband signal. The radio frequency circuit 1040 is configured to modulate a low frequency baseband signal to a high frequency carrier signal, where the high frequency carrier signal is transmitted by using the antenna 1050. The radio frequency circuit is also configured to demodulate a high frequency signal received by the antenna 1050 to a low frequency carrier signal. All components of the station 1000 are coupled together by using a bus 1060. In addition to a data bus, the bus system 1060 further includes a power bus, a control bus, and a status signal bus. However, for clarity of description, various buses are marked as the bus system 1060 in the figure. It should be noted that the foregoing description of the structure of the access point may be applied to subsequent embodiments.

The baseband circuit 1030 is configured to generate a trigger frame carrying a target media access control MAC function, where the trigger frame includes indication information, the indication information is used to instruct a first station to send a MAC frame corresponding to the target MAC function, and the indication information is used to instruct a second station not to perform the target MAC function.

The radio frequency circuit 1040 is configured to send the trigger frame.

The AP generates the trigger frame carrying the target MAC function. The target MAC function may include a single MAC function or a plurality of MAC functions. Further, optionally, the trigger frame may indicate, in a common field, a quantity of MAC functions carried in the trigger frame, and further indicate the carried MAC function by using a trigger frame type identifier.

Optionally, if the trigger frame carries only a single MAC function, a trigger frame type field in the common field indicates the carried MAC function; or if the trigger frame carries a plurality of MAC functions, all carried MAC functions may be indicated by using all trigger frame type fields in MAC function field common information.

Optionally, the first station may include at least one station STA, and the second station may include at least one station STA. The AP performs multiuser transmission with a plurality of STAs by using the OFDMA; that is, the AP performs the multiuser transmission with each station in the first station and each station in the second station by using the OFDMA.

Further, optionally, the AP may indicate an uplink transmission resource to the first station and the second station by using trigger information of a per station field corresponding to each station in the trigger frame. Generally, the trigger information includes a station identifier of a station corresponding to the trigger information.

The trigger frame includes first information of the first station and second information of the second station. The first information may include first trigger information corresponding to the first station and MAC function information corresponding to the first station. The second information may include second trigger information of the second station. The first trigger information is used to indicate an uplink transmission resource of the first station, and the second trigger information is used to indicate an uplink transmission resource of the second station. Generally, the MAC function information is encapsulated in a MAC function field. The MAC function field includes a MAC function common information field and a MAC function field in the per station field.

It should be noted that some MAC functions may not include either MAC function common information or the MAC function field in the per station field.

Optionally, each MAC function field in the per station field may also include an identifier of a station corresponding to the MAC function field. Each station in the first station may send, based on MAC function information in the per station field corresponding to the station, a MAC frame corresponding to a target MAC function carried in the trigger frame.

Further, the trigger frame includes indication information. The indication information is used to: instruct the first station to send the MAC frame corresponding to the target MAC function carried in the trigger frame, and instruct the second station not to perform the target MAC function. The indication information may exist in a plurality of manners.

Optionally, when receiving the trigger frame, each station may learn, by parsing the indication information, whether to perform the target MAC function carried in the trigger frame.

If the target MAC function needs to be performed, MAC function information corresponding to the station is further parsed, and a MAC frame corresponding to the target MAC function is sent based on the MAC function information; or if the target MAC function does not need to be performed, data is sent based on trigger information corresponding to the station in the trigger frame without being limited by the target MAC function. In this way, whether each station performs the target MAC function can be flexibly controlled.

First, the target MAC function may include a single MAC function or a plurality of MAC functions.

In an embodiment, if the target MAC function includes a single MAC function, a trigger frame type identifier is used in a trigger frame to identify the single MAC function.

In an optional implementation, the indication information may include an indication value that is used to represent a quantity of target stations included in the first station. The first station is a station that needs to be instructed by the AP to send a MAC frame corresponding to a target MAC function. For example, the indication information may be a quantity of target stations L included in the first station, may be a difference between a total quantity of stations N in the first station and a total quantity of stations L in the second station, or the like. The indication information may be located in the common field of the trigger frame, or may be located in a trigger information common field of the trigger frame. This is not limited in this embodiment.

In the per station area of the trigger frame, consecutive target fields that start with a preset location and that are corresponding to a quantity of targets include the first information of the first station. The preset location may be a start location of the per station area, or may be an end location of the per station area. If the preset location is the end location, the target fields are located before the end location.

Optionally, trigger information and MAC function information of each station may be encapsulated together in a target field of a per station area of the trigger frame.

Optionally, trigger information and MAC function information of each station may alternatively be respectively encapsulated in a trigger information single field and a MAC function single field of a per station area.

Optionally, in the per station area, a field other than the target field includes the second information of the second station. The second information of the second station includes the second trigger information corresponding to the second station. The second station transmits data on an uplink transmission resource specified by the second trigger information without being limited by the target MAC function carried in the trigger frame.

Likewise, based on the encapsulation manner of the first information of the first station, the second information of the second station may also have two encapsulation manners. In FIG. 3, a per station field of a per station area of the second station includes only the second trigger information. In FIG. 4, the trigger information single field of the second station includes second trigger information of each station, but the MAC function single field does not include a related MAC function field of the second station.

Specifically, optionally, as shown in FIG. 3, the trigger frame indicates, in the common field, the quantity of target stations L included in the first station. The common field further includes the MAC function field common information. It should be noted that, for some MAC functions, the MAC function field common information may not be included.

In the per station field of the per station area, L STAs (that is, each station in the first station) in N STAs include both the trigger information and the MAC function information, and other N-L STAs (that is, each station in the second station) include only the trigger information. To enable all STAs to learn which STAs include per MAC function information (an STA that includes the MAC function information needs to send a MAC frame corresponding to a target MAC function) and which STAs do not include per MAC function information (an STA that does not include the MAC function information does not need to perform the target MAC function), in this embodiment, trigger information of the L STAs (that is, the first station) including the MAC function information and the MAC function information are all arranged in foremost consecutive target fields in the per station area, and then L is indicated in the common area. In this way, the STA that needs to parse the trigger frame may learn that the per station area of the first L STAs may include the MAC function information, and the per station area of last N-L STAs may not include the MAC function information.

Optionally, both trigger information and MAC function information of the L STAs that include the MAC function information may be placed in last consecutive target fields. In this way, the STA that needs to parse the trigger frame may learn that the per station area of first N-L STAs may not include the MAC function information, and the per station area of last L STAs may include the MAC function information.

It should be noted that trigger information of each STA is encapsulated in a trigger information field of the trigger frame, and MAC function information of each STA is encapsulated in the MAC function field of the trigger frame.

It should be noted that another alternative manner may be used to indicate L; for example, N-L or L-1 is indicated. Another method that may have a same effect in indicating L is not limited in the solution of the present disclosure.

Specifically, optionally, as shown in FIG. 4, trigger information of all the STAs (the first station and the second station are included) may appear at the same time, and then MAC function information of the first station STA appears at the same time. In this case, by indicating L and arranging the STAs in a corresponding way, the STAs may learn that trigger information single field of the per station area includes trigger information of N STAs, but a MAC function information field of the per station area may include only MAC function information of L STAs.

It should be noted that in trigger information single fields, trigger information of L stations of the first station needs to be arranged in foremost target fields. When parsing the trigger information single field in the trigger frame, the STA may learn, based on a sequence and an indication value of the STA, whether the MAC function information is included, and may further learn whether the MAC frame corresponding to the target MAC function needs to be sent.

In another optional implementation, the indication information may include an indication character. The indication character includes a first character and a second character. The first character is used to instruct a corresponding station to send the MAC frame corresponding to the target MAC function, and the second character is used to instruct a corresponding station not to perform the target MAC function. If the corresponding station needs to send the MAC frame corresponding to the target MAC function, the trigger frame needs to further include the MAC function information of the station; or if the corresponding station does not need to perform the target MAC function, the trigger frame does not include the MAC function information of the station. It should be noted that the MAC function information is encapsulated in the MAC function field, and the trigger frame may include the MAC function field, so as to ensure a unified format; however, the MAC function field may use a default value to instruct the station not to perform the target MAC function.

Specifically, optionally, the first character may be "0", and the second character may be "1". Certainly, alternatively, the first character may be "1", and the second character is "0". This is not limited herein.

In the former optional implementation, the L STAs performing the MAC function are arranged, so that some STAs perform the MAC function, and in addition, an objective of reducing indication overheads is achieved.

In this implementation, a relatively flexible indication function may be implemented, and it is not necessary to arrange STAs. An N-bit MAC function field bitmap is introduced to perform indication for stations, or perform bit indication for each STA. The following separately describes the two implementations.

Optionally, the bitmap is used to notify each STA whether the per station field of the per station area of the STA includes both trigger information and MAC function information. A quantity of bits included in the bitmap is a total quantity of stations included in the first station and the second station.

Optionally, if a station includes the MAC function information, the per station field of the station includes the MAC function field. Actually, each character in the bitmap is used to indicate whether each per station field in the per station area includes the MAC function field.

Optionally, the MAC function bitmap is located in the common field, each per station field of the per station area includes information of each station, and the information is trigger information and MAC function information of the first station, or the information is trigger information of the second station.

It should be noted that a sequence of all stations indicated in the bitmap needs to be consistent with an arrangement order of all stations in a per station area.

Optionally, for example, 1 is used to indicate that a per station field of an STA includes both trigger information and MAC function information, and 0 is used to indicate that a per station field of an STA includes only the trigger information. In an N-bit indication, L bits may be 1, which indicates that a per station field of L STAs includes both the trigger information and the MAC function information; and N−L bits may be 0, which indicates that a per station field of N−L STAs includes only the trigger information. Certainly, alternatively, 0 and 1 may indicate an opposite meaning. This is not limited in the solution of the present disclosure.

Optionally, the MAC function bitmap is located in a trigger information common field, trigger information of all stations exists as a trigger information single field, and MAC function information of all the stations exists as a MAC function single field. It should be noted that an arrangement order of all stations in the trigger information single field and the MAC function information single field needs to be consistent with a sequence of all stations indicated by all characters in the MAC function bitmap.

Optionally, MAC function performing indication is performed for a station corresponding to each field in a per station area.

Specifically, optionally, the indication character may be located in each station field of the per station area, and is used to indicate whether a station corresponding to the station field includes the MAC function information. If the MAC function information is included, the station needs to send, based on the MAC function information, the MAC frame corresponding to the target MAC function.

Optionally, 1 is used to indicate that a per station field of an STA includes both trigger information and MAC function information, and 0 is used to indicate that a per station field of an STA includes only the trigger information.

Optionally, trigger information and MAC function information of all stations are separately encapsulated, that is, the trigger information of all the stations is encapsulated in the trigger information single field, and the MAC function information of the first station is encapsulated in the MAC function single field.

Optionally, the indication character is located in the trigger information single field, and trigger information single field of each station may include a 1-bit indication character for indication. If 10 STAs in total need to be scheduled, where the per station field of the per station area of the first, the fourth, the fifth, and the sixth STA includes both the trigger information and the MAC function information, and a per station field of other STAs includes only the trigger information. One bit may exist in a per station trigger information field of the second, the third, the seventh, the eighth, the ninth, and the tenth STAs for indicating 0; and one bit may exist in the per station trigger information field of the first, the fourth, the fifth, and the sixth STAs for indicating 1.

In another optional implementation, the indication information may include a length of a per station field corresponding to each station in a per station area. It should be noted that in this manner, the target MAC function does not need to be performed, and therefore, a per station field corresponding to the second station does not include the MAC function field.

In this embodiment, in addition to indicating a per station field of each per station area by using a 1-bit indication character, an indication method in which a length of a per station field corresponding to a per station area of each STA is indicated may also be directly used. Each STA determines, by parsing a length of a station field corresponding to the STA in the trigger frame, whether the target MAC function needs to be performed.

Optionally, the indication method in which a length of a per station field in a per station area is indicated may also be replaced by another indication method. For example, if a length of a per station area of each STA is at least L3, the length may be directly indicated as L−L3 when the length is indicated. If a station field includes both a per station trigger information field and a per station MAC function field, a length of the station field is indicated as L1+L2−L3. For a length of a per station field that includes only a per station trigger information field, a length of the per station field is indicated as L1−L3.

Certainly, a type of each station field in a per station area may be indicated for each STA, or indexing is performed by length. Another method that may be used to achieve a same effect in indicating a length is not limited in the solution of the present disclosure.

Optionally, length indication may be separately performed for each STA in each station field of a per station area.

In this embodiment, if the station is the first station, a per station field of one station includes length indication information of the station, trigger information of the station, and MAC function information of the station; or if the station is the second station, a per station field of one station includes length indication information of the station and trigger information of the station.

Generally, a length of trigger information of a station is constant, and therefore, the STA may determine, based on a length of a per station field, whether a station corresponding to the station field needs to perform the target MAC function.

Optionally, the length indication may be in each field of the trigger information single field. In this embodiment, per station trigger information of all stations is encapsulated in the trigger information single field, and per station MAC function information of the first station is encapsulated in the MAC function single field.

In the trigger information single field, each station field includes only trigger information of each station, and in addition, a length of a per station field corresponding to the station is indicated in each station field of the trigger information single field. A per station field includes the trigger information field and the MAC function field of the station.

Optionally, lengths may alternatively be indicated together. It is indicated in the common field of the trigger frame that a quantity of STAs with a per station field length of L1+L2 is L, and a quantity of STAs with a per station field length of L1 is N−L. L1 is used to represent a length of the trigger information field, and L2 is used to represent a length of the MAC function field.

It should be noted that a per station field in a per station area needs to be arranged based on a length indicated in the common field; that is, a per station field corresponding to the first station including both the trigger information and the MAC function information needs to be arranged in the first part, and a per station field corresponding to the second station including only the trigger information needs to be arranged in the last part.

Further, the length indication method may be used to instruct a trigger frame carrying a single MAC function, and may also be used to instruct a trigger frame carrying a plurality of MAC functions. When a length of a per station field is merely equal to a length of the trigger information field, the scheduled STA does not need to perform a corresponding target MAC function. When a length of a per station field is greater than the length of the trigger information field, it indicates that the scheduled STA needs to send the MAC frame corresponding to the target MAC function.

It should be noted that in the foregoing method in which a length is used for indication, a length unit may be bit.

In another optional implementation, the indication information may be a default value. In this embodiment, the default value is used to instruct a corresponding STA not to perform the target MAC function.

In several optional implementations described above, MAC function fields of some STAs are not carried, and some extra indications are used, so as to achieve an effect that some STAs (that is, the second station) do not perform the target MAC function.

Specifically, a per station field of an STA that does not need to perform the target MAC function does not carry the MAC function field, so as to reduce overheads. In this embodiment, the STA that does not perform the target MAC function also carries the MAC function field, so as to ensure a unified format. However, to enable the STA to learn whether to perform the MAC function, in addition to using the indication method described above (for example, indication is performed by using the indication character), the indication method that is based on a default value and that is provided in this embodiment may alternatively be used; that is, a value of a MAC function field of a per station area of an STA that does not need to perform the target MAC function is set to the default value.

Optionally, the MAC function field may carry one or more reserved bits to represent the default value. Further, optionally, the reserved bit may be set to a non-reserved value (for example, changing from a reserved value of 0 to 1, or changing from a reserved value of 1 to 0). When finding, through parsing, that a reserved bit of the MAC function field is a non-reserved value, the STA does not need to perform the target MAC function; or when finding, through parsing, that the reserved bit of the MAC function field is a reserved value, the STA needs to perform the target MAC function.

Further, optionally, some sub-fields of the MAC function field are not used for indication; that is, indications of some sub-fields are reserved. Therefore, the sub-fields may be indicated as reserved conditions. When finding that a sub-field of the MAC function field is indicated as a non-reserved condition, the STA needs to perform the target MAC function; or when finding that a sub-field of the MAC function field is indicated as a reserved condition, the STA does not need to perform the target MAC function.

Further, optionally, some bit combinations are specially reserved in the MAC function field to indicate that the MAC function does not need to be performed. When finding, through parsing, that the bit of the MAC function field is a non-reserved bit combination, the STA does not need to perform the target MAC function; or when finding, through parsing, that the bitmap of the MAC function field is a reserved bit combination, the STA needs to perform the target MAC function. For example, if MAC function fields of an STA are all 0s or all 1s, the STA does not need to perform the target MAC function; or if MAC function fields of an STA are not all 0s or all 1s, the STA needs to perform the corresponding target MAC function.

In another embodiment, the target MAC function may include a plurality of MAC functions, that is, the trigger frame carries a plurality of MAC functions. A MAC function common field of the trigger frame that carries a plurality of MAC functions includes a plurality of fields, each field includes one trigger frame type indication, and one trigger frame type indication is corresponding to one MAC function, so that different STAs are scheduled at the same time to respond, based on different trigger frame types, with MAC frames corresponding to different MAC functions.

When a format of the trigger frame that carries a plurality of MAC functions is designed, it also needs to be implemented that some STAs do not perform the MAC function, and some STAs send the MAC frame corresponding to the MAC function.

Optionally, in this embodiment, an empty trigger frame type is used to indicate the STA that does not need to perform the MAC function; that is, the STA that does not need to perform the target MAC function is corresponding to the empty trigger frame type.

It should be noted that a trigger frame type 0 is used to indicate that the trigger frame does not carry the MAC function, carries a single MAC function and a type of the single MAC function, or carries a plurality of MAC functions.

It should be noted that when a plurality of MAC functions exist, trigger frame types 1-S indicate types of all MAC functions. Optionally, the trigger frame type 0 may be not used, and the trigger frame types 1-S may be directly used to indicate, in chain in each MAC trigger frame type field, whether a next trigger frame type exists. If the trigger frame does not carry the MAC function, the first trigger frame type is the empty trigger frame type, and a next trigger frame type does not exist.

In this embodiment, the empty trigger frame type is mainly used to instruct some STAs not to perform the target MAC function. When a type of a trigger frame is indicated as empty, a per station field of the STA may not carry a per station MAC function field of the STA, and in addition, may not carry MAC function field common information of the STA.

Optionally, per station trigger information of each station is encapsulated in a trigger information field. A MAC function field includes a MAC function common field and a per station MAC function field. The MAC function common field is used to encapsulate each trigger frame type, and a per station MAC function field is used to encapsulate MAC function information of each station. It should be noted that an empty trigger frame type is corresponding to a station that does not perform a target MAC function.

Optionally, MAC function information of a first station (that is, a station that needs to perform a corresponding MAC function) is encapsulated in each field of a per station MAC function field. Further, MAC function information of the STA is encapsulated in a trigger frame type field corresponding to a MAC function that needs to be performed. For example, STA1-STAN1 perform a MAC function indicated by a trigger frame type 1, and MAC function information of STA1-STAN1 is encapsulated in a per station MAC function field corresponding to the trigger frame type 1.

A remaining STA that does not encapsulate the MAC function information is corresponding to the empty trigger frame type; that is, the STA does not need to perform a corresponding MAC function. In this way, different STAs are instructed to perform different MAC functions; and in addition, some STAs may be instructed not to perform a corresponding MAC function, that is, data may be directly sent based on trigger information.

It should be noted that in this embodiment, a per station trigger information field is located before the MAC function common field, and the MAC function common field is located before a per station MAC function field.

Optionally, a MAC function common field of the trigger frame includes each trigger frame type field, trigger information of each station is encapsulated in a per station trigger information field, and per station MAC function information is encapsulated in a per station MAC function field. In addition, the MAC function common field is located before a per station trigger information field, and a per station trigger information field is located before a per station MAC function field. If an STA does not include corresponding MAC function information, the station is corresponding to an empty trigger frame type.

Optionally, a trigger frame includes a MAC function common field and a per station field. The MAC function common field is used to indicate various trigger frame types, which include an empty trigger frame type. A per station field is used to encapsulate information of each station, for example, trigger information and MAC function information of a first station, or trigger information of a second station.

Specifically, optionally, information about a station corresponding to the trigger frame type is encapsulated in a per station field corresponding to each trigger frame type of the trigger frame. A station corresponding to the empty trigger frame type is a station that does not carry MAC function information, that is, a station that does not perform a target MAC function.

It should be noted that a per station field of each station may still carry a corresponding MAC function field, so as to ensure a unified format.

Further, if a maximum value of S is limited to be 2, an effect described in the previous embodiment may be achieved by setting a trigger frame type 1 to a type of trigger frame, and setting a trigger frame type 2 to the empty trigger frame type, that is, the trigger frame carries only one MAC function, and only some STAs are scheduled to perform the MAC function.

Specifically, the AP sends an encapsulated trigger frame. The trigger frame carries a target MAC function, and the target MAC function includes one MAC function or a plurality of MAC functions. An STA within a coverage area of the AP may receive the trigger frame, parse the trigger frame, and obtain trigger information of the STA to determine an uplink transmission resource.

Further, the STA further needs to determine, based on the trigger frame, whether the target MAC function carried in the trigger frame needs to be performed. If the target MAC function needs to be performed, the STA further needs to parse the trigger frame to obtain MAC function information of the STA, and send, based on the MAC function information, the MAC frame corresponding to the target MAC function. The MAC function information may include some MAC parameters. For different STAs, MAC function parameters may be different.

Optionally, when parsing the trigger frame, the STA may perform a search by using an STA identifier of the STA. In the trigger frame, a trigger information field or a MAC function field may carry an identifier of a station corresponding to the trigger information or MAC function information.

Further, optionally, after receiving and parsing the trigger frame, the STA needs to determine whether to perform carrier sense before performing uplink transmission.

According to a new specification that is introduced into 802.11ax, before the AP sends the trigger frame to trigger the STA to perform the uplink transmission, the STA needs to perform the carrier sense in some cases and does not need to perform the carrier sense in other cases. In some cases, CS needs to be performed for a response frame corresponding to the trigger frame, and a main reason is that a dense scenario is considered in 802.11ax, uplink multiuser transmission is introduced, and a plurality of STAs may send the response frame at the same time.

Optionally, a quantity of stations is introduced as a criterion for determining whether the STA needs to perform the CS in uplink transmission; that is, the AP sends the trigger frame to trigger the STA to perform the uplink multiuser transmission, and the STA determines on its own, by using specific information in the trigger frame or based on a preset factor, whether the CS needs to be performed before uplink data transmission.

The specific information or a factor used for the determining by the STA on its own includes at least a factor K, and the factor K is a quantity of stations scheduled by the trigger frame of the AP at this time.

Currently, whether the STA performs the CS is considered in two dimensions: First, the AP instructs, by carrying the specific information in the trigger frame, the STA whether to perform the CS before receiving the trigger frame and transmitting data; and second, the STA determines, based on information of the trigger frame and some preset rules, whether the CS needs to be performed. This embodiment is applicable to any case described above.

The introduced rule K is: When a quantity of scheduled stations is less than a threshold, the STA does not need to perform the CS; or when a quantity of scheduled stations is greater than a threshold, the STA needs to perform the CS.

In addition, optionally, if a plurality of factors 1-N exist, and this priority exists: a factor 1>a factor 2> . . . >a factor N, when it is determined, based on factors 1, 2, . . . , K−1, that the CS needs to be performed:
When it is determined, based on a factor K, that the CS does not need to be performed, the STA is instructed not to perform the CS.
When it is determined, based on a factor K, that the CS needs to be performed, the STA is instructed not to perform the CS.
When it is determined, based on factors 1, 2, . . . , N, that the CS needs to be performed, the STA is instructed to perform the CS.

If a plurality of factors 1-N exist, and this priority exists: a factor 1>a factor 2> . . . a factor N, when it is determined, based on factors 1, 2, . . . , K−1, that the CS does not need to be performed, the STA is instructed not to perform the CS.

If K=1 and another factor L>1 exists, and this priority exists: a factor 1>a factor 2> . . . a factor N, when it is determined, based on factors 1, 2, . . . , L, that the CS needs to be performed:
When it is determined, based on the factor L, that the CS does not need to be performed, the STA is instructed not to perform the CS.
When it is determined, based on the factor L, that the CS needs to be performed, the STA is instructed not to perform the CS.

If K=1 and another factor L>1 exists, and this priority exists: a factor 1>a factor 2> . . . a factor N, when it is determined, based on factors 1, 2, . . . , L, that the CS needs to be determined, the STA is instructed not to perform the CS.

In this embodiment of the present disclosure, the access point generates the trigger frame carrying the target MAC function, and the trigger frame includes the indication information. The indication information is used to instruct the first station to send the MAC frame corresponding to the target MAC function, and is used to instruct the second station not to perform the target MAC function. That is, a MAC frame type sent by the second station is not limited, and data sending manners of the first station and the second station can be flexibly controlled.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

A sequence of the steps of the method in the embodiments of the present disclosure may be adjusted, and certain steps may also be merged or removed based on an actual requirement.

The modules or the units in the terminal in the embodiments of the present disclosure may be combined, divided, and deleted based on an actual requirement.

Components such as a microcontroller in the embodiments of the present disclosure may be implemented by using a universal integrated circuit, for example, a central processing unit (CPU), or by using an application-specific integrated circuit (ASIC).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for transmitting a trigger frame in a wireless local area network, the method comprising:
generating, by an access point, a trigger frame carrying a target media access control (MAC) function, wherein the trigger frame comprises indication information for instructing a first station to send a MAC frame corresponding to the target MAC function, and for instructing a second station not to perform the target MAC function, wherein the trigger frame comprises first information of the first station comprising first trigger information corresponding to the first station and MAC function information corresponding to the first station, and second information of the second station comprising second trigger information corresponding to the second station, wherein the indication information comprises an indication value for representing a quantity of target stations comprised in the first station, or wherein the indication information comprises an indication character having a first character and a second character, the first character for instructing a corresponding station to send a MAC frame corresponding to the target MAC function, and the second character for instructing a corresponding station not to perform the target MAC function, the first information of the first station comprising, in a per station area of the trigger frame, consecutive target fields that start with a preset location and that correspond to the quantity of the targets, and the second information of the second station comprising, in a per station area of the trigger frame, a field other than the target fields; and
sending, by the access point, the trigger frame.

2. The method according to claim 1, wherein:
an indication character of the first station and an indication character of the second station are located in a common field of the trigger frame; and
a per station area of the trigger frame comprises station field information that has a sequence that is consistent with a sequence of all indicated stations corresponding to all indication characters in the common field, and the station field information comprises the first information corresponding to each station in the first station or the second information corresponding to each station in the second station.

3. The method according to claim 1, wherein the indication character is located in a station field corresponding to each station in a per station area of the trigger frame, the indication character for instructing a station corresponding to the station field whether to send a MAC frame corresponding to the target MAC function.

4. The method according to claim 1, wherein:
the trigger frame comprises a MAC function field of the first station and a MAC function field of the second station;
the MAC function information corresponding to the first station is encapsulated in the MAC function field of the first station;
the indication information is encapsulated in the MAC function field of the second station; and
the indication information comprises a default value for instructing the second station not to perform the target MAC function.

5. An apparatus for transmitting a trigger frame in a wireless local area network, the apparatus comprising:

a baseband circuit, configured to generate a trigger frame carrying a target media access control (MAC) function, wherein the trigger frame comprises indication information for instructing a first station to send a MAC frame corresponding to the target MAC function, and for instructing a second station not to perform the target MAC function, wherein the trigger frame comprises first information of the first station comprising first trigger information corresponding to the first station and MAC function information corresponding to the first station, and second information of the second station comprising second trigger information corresponding to the second station, wherein the indication information comprises an indication value for representing a quantity of target stations comprised in the first station, or wherein the indication information comprises an indication character having a first character and a second character, the first character for instructing a co responding station to send a MAC frame corresponding to the target MAC function, and the second character for instructing a corresponding station not to perform the target MAC function, the first information of the first station comprising, in a per station area of the trigger frame, consecutive target fields that start with a preset location and that correspond to the quantity of the targets, and the second information of the second station comprising, in a per station area of the trigger frame, a field other than the target fields; and a radio frequency circuit, configured to send the trigger frame.

6. The apparatus according to claim 5, wherein:

an indication character of the first station and an indication character of the second station are located in a common field of the trigger frame; and a per station area of the trigger frame comprises station field information that has a sequence that is consistent with a sequence of all indicated stations corresponding to all indication characters in the common field, and wherein the station field information comprises the first information corresponding to each station in the first station or the second information corresponding to each station in the second station.

7. The apparatus according to claim 5, wherein the indication character is located in a station field corresponding to each station in a per station area of the trigger frame, the indication character for instructing a station corresponding to the station field whether to send a MAC frame corresponding to the target MAC function.

8. The apparatus according to claim 5, wherein:

the trigger frame comprises a MAC function field of the first station and a MAC function field of the second station;

the MAC function information corresponding to the first station is encapsulated in the MAC function field of the first station;

the indication information is encapsulated in the MAC function field of the second station; and the indication information comprises a default value for instructing the second station not to perform the target MAC function.

* * * * *